United States Patent
Tanji

(10) Patent No.: US 8,286,097 B2
(45) Date of Patent: Oct. 9, 2012

(54) IMAGE PROCESSING APPARATUS FOR EXECUTING A PROCESS FLOW, METHOD OF CONTROLLING THE SAME AND STORAGE MEDIUM

(75) Inventor: Masamichi Tanji, Kawasaki (JP)

(73) Assignee: Canon Kabushiki Kaisha (JP)

( * ) Notice: Subject to any disclaimer, the term of this patent is extended or adjusted under 35 U.S.C. 154(b) by 344 days.

(21) Appl. No.: 12/611,472

(22) Filed: Nov. 3, 2009

(65) Prior Publication Data
US 2010/0115470 A1    May 6, 2010

(30) Foreign Application Priority Data
Nov. 4, 2008 (JP) .................................. 2008-283307

(51) Int. Cl.
G06F 3/048 (2006.01)
(52) U.S. Cl. ...................................................... 715/840
(58) Field of Classification Search .......... 715/738–741, 715/744, 746, 840; 714/36, 39, 51, 57
See application file for complete search history.

(56) References Cited

U.S. PATENT DOCUMENTS

| | | | | |
|---|---|---|---|---|
| 5,821,926 A | * | 10/1998 | Arita .............................. | 715/744 |
| 6,014,528 A | * | 1/2000 | Natsume et al. ................ | 399/19 |
| 7,577,662 B2 | * | 8/2009 | Kasatani ............................... | 1/1 |
| 2006/0061817 A1 | * | 3/2006 | Kakigi et al. ................. | 358/1.15 |
| 2007/0159663 A1 | * | 7/2007 | Tsujimoto ..................... | 358/448 |
| 2007/0256020 A1 | * | 11/2007 | Haga ............................. | 715/741 |
| 2007/0268517 A1 | * | 11/2007 | Koarai .......................... | 358/1.15 |

FOREIGN PATENT DOCUMENTS

JP           2002-190889 A        7/2002

* cited by examiner

*Primary Examiner* — Doon Chow
*Assistant Examiner* — Wilson Varga
(74) *Attorney, Agent, or Firm* — Rossi, Kimms & McDowell LLP

(57) ABSTRACT

An image processing apparatus which is capable of executing a processing flow without changing the contents thereof even when the processing flow includes a process that cannot be executed by itself. When a processing flow includes an unexecutable process, the apparatus transmits a request for confirming whether or not the processing flow is executable, to other image processing apparatuses, and receives a response indicating that the processing flow is executable, from any of the other apparatuses. The apparatus determines a transfer destination of the processing flow from the other image processing apparatuses. The apparatus generate from the processing flow a first cooperation processing flow including executable processes and a second cooperation processing flow including at least one unexecutable process, and transfers the second cooperation processing flow to the determined transfer destination. The apparatus displays an execution button for executing the first cooperation processing flow.

4 Claims, 28 Drawing Sheets

FIG. 4

| ID 401 | PROCESSING FLOW NAME 402 | DISCLOSURE RANGE 403 | TASK 404 | COOPERATION FLOW 405 | Serial ID 406 | COOPERATION TYPE 407 | INFORMATION ON COOPERATION DESTINATION 408 |
|---|---|---|---|---|---|---|---|
| 1 | CONFIDENTIAL DOCUMENT TRANSMISSION | User A | Scan, Signature, Send | N | — | — | — |
| 2 | MEETING MINUTES DISTRIBUTION | User A | Scan, Send | N | — | — | — |
| 3 | DOCUMENT COMBINING PRINTING | User B | Scan, Box, Combine, print | N | — | — | — |
| 4 | BUSINESS TRIP APPLICATION | SHARED | Box, Send | N | — | — | — |
| ... | ... | ... | ... | ... | ... | ... | ... |

PROCESSING FLOW DEFINITION FILE    500

```
<?xml version="1.0"encoding="utf-8"?>
<Taskflow id="1"caption= "CONFIDENTIAL DOCUMENT
                         TRANSMISSION">          550
  <Task type="Scan">~501
    <Setting>....</Setting>
  </Task>
  <Task type-="Signature">~502
    <Doc id="SCAN 101">
  </Task>
  <Task type-="Send">~503
    <Setting type="Addr">~504
     Customer@ · · ·
    </Setting>
    <Setting>....</Setting>
  </Task>
</Taskflow>
```

FIG. 5B

TASKFLOW TAG    550

```
<Taskflow id="1"caption= "CONFIDENTIAL
                         DOCUMENT TRANSMISSION">
         551                    552
```

FIG. 9A

PROCESSING FLOW DEFINITION FILE
(FIRST COOPERATION PROCESSING
FLOW DEFINITION FILE)                    900

```
<?xml version="1.0"encoding="utf-8"?>
<Taskflow id="1"caption= "CONFIDENTIAL DOCUMENT
                         TRANSMISSION"                  }950
    Serial id="aabbccdd0001",Dst Serial id="aabbccdd0002">
  <Task type="Scan">~901
    <Setting>....</Setting>
  </Task>
  <Task type-="Send">~902
    <Setting type="Addr"> ~903
      192.168.0.102
    </Setting>
    <Doc id="scan 101">~904
    <Setting>Activate"aabbccdd0002"</Setting>~905
  </Task>
</Taskflow>
```

FIG. 9B

TASKFLOW TAG                              950

```
         951                    952
<Taskflow id="1"caption= "CONFIDENTIAL
                         DOCUMENT TRANSMISSION"
    Serial id="aabbccdd0001",Dst Serial id="aabbccdd0002">
                953                       954
```

FIG. 10A

PROCESSING FLOW DEFINITION FILE        1000

```
<?xml version="1.0"encoding="utf-8"?>
<Taskflow id=" "caption= "CONFIDENTIAL DOCUMENT
                         TRANSMISSION"                  }1050
    Serial id="aabbccdd0002",Src Serial id="aabbccdd0001">

<Task type="Receive">~1001
    <Doc id="scan 101">
  </Task>
  <Task type="Signature"> ~1002
    <Doc id="scan 101">
  </Task>
  <Task type="Send"> ~1003
    <Setting type="Addr">~1004
      Customer@ · · ·
  </Setting>
    <Setting>....</Setting>
  </Task>
</Taskflow>
```

FIG. 10B

TASKFLOW TAG        1050

```
      1051                    1052
        }                       }
<Taskflow id="    "caption= "CONFIDENTIAL
                             DOCUMENT TRANSMISSION>
    Serial id="aabbccdd0002",Src Serial id="aabbccdd0001"
                   }                        }
                 1053                      1054
```

FIG. 12

| ID 401 | PROCESSING FLOW NAME 402 | DISCLOSURE RANGE 403 | TASK 404 | COOPERATION FLOW 405 | Serial ID 406 | COOPERA-TION TYPE 407 | INFORMATION ON COOPERATION DESTINATION 408 |
|---|---|---|---|---|---|---|---|
| 1 | CONFIDENTIAL DOCUMENT TRANSMISSION | User A | Scan, Signature, Send | Y | aabbccdd 0001 | Src | BBB/192.168.0.102 aabbccdd 0002 |
| 2 | MEETING MINUTES DISTRIBUTION | User A | Scan, Send | N | — | — | — |
| 3 | PRINT OUT FILE | User B | Box, Print | N | — | — | — |
| 4 | BUSINESS TRIP APPLICATION | SHARED | Box, Send | N | — | — | — |
| ... | | | | | | | |

| 1401 | 1402 | 1403 | 1404 | 1405 | 1406 | 1407 | 1408 |
|---|---|---|---|---|---|---|---|
| ID | PROCESSING FLOW NAME | DISCLOSURE RANGE | TASK | COOPERATION FLOW | Serial ID | COOPERA-TION TYPE | INFORMATION ON COOPERATION DESTINATION |
| 1 | CONFIDENTIAL DOCUMENT TRANSMISSION | User A | Scan, Signature, Send | N | — | — | — |
| 2 | CONFIDENTIAL DOCUMENT TRANSMISSION | User A | Receive, Signature, Send | Y | aabbccdd 0002 | Dst | AAA/192.168.0.101 aabbccdd 0001 |
| ⋮ | | | | | | | |

PROCESSING FLOW DEFINITION FILE  1900

```
<?xml version="1.0"encoding="utf-8"?>
<Taskflow id="2"caption="DOCUMENT COMBINING PRINTING">
  <Task type="Scan">  ~1901
    <Setting>....</Setting>                    1950
  </Task>
  <Task type="Box">  ~1902
    <Doc id="doc 101">  ~1903
    <Setting>....</Setting>
  </Task>
  <Task type="Combine">  ~1904
    <Doc id="doc 101">
    <Doc id="scan 001">  }~1905
  </Task>
  <Task type="Print">  ~1906
    <Setting>....</Setting>
  </Task>
</Taskflow>
```

FIG. 19B

TASKFLOW TAG  1950

```
<Taskflow id="2  "caption="DOCUMENT COMBINING PRINTING">
            1951                1952
```

FIG. 20A

PROCESSING FLOW DEFINITION FILE 2000 2050

```
<?xml version="1.0"encoding="utf-8"?>
<Taskflow id="2"caption="DOCUMENT COMBINING PRINTING"
 Serial id="aabbccdd0003",Dst Serial id="aabbccdd0004">
 <Task type="Scan"> ~2001
    <Doc id="scan001">
    <Setting>....</Setting>
 </Task>
 <Task type="Box"> ~2002
    <Doc id="doc 101"> ~2003
    <Setting>....</Setting>
 </Task>
 <Task type="Send"> ~2004
    <Setting type="Addr"> ~2005
    192.168.0.103
    </Setting>
    <Doc id="doc 101"> ~2006
    <Doc id="scan 001">
    <Setting >Activate"aabbccdd0004"</Setting>" ~2007
 </Task>
</Taskflow>
```

FIG. 20B

TASKFLOW TAG 2050

```
     2051                      2052
<Taskflow id="2 "caption="DOCUMENT COMBINING PRINTING"
 Serial id="aabbccdd0003",Dst Serial id="aabbccdd0004">
            2053                      2054
```

FIG. 21A

PROCESSING FLOW DEFINITION FILE    2100    2050

```
<?xml version="1.0"encoding="utf-8"?>
<Taskflow id=" "caption= "DOCUMENT COMBINING PRINTING"
  Serial id="aabbccdd0004",Src Serial id="aabbccdd0003">
  <Task type="Receive">  ~2101
    <Doc id="doc 101">
    <Doc id="scan 001">  }~2102
  </Task>
  <Task type="Combine">  ~2103
    <Doc id="doc 101">
    <Doc id="scan 001">  }~2104
  </Task>
  <Task type="Print">  ~2105
    <Setting>....</Setting>
  </Task>
</Taskflow>
```

FIG. 21B

TASKFLOW TAG    2150

```
       2151              2152
<Taskflow id="   "caption="DOCUMENT COMBINING PRINTING"
  Serial id="aabbccdd0004",Src Serial id="aabbccdd0003">
                 2153                    2154
```

FIG. 23

| ID 2301 | PROCESSING FLOW NAME 2302 | DISCLOSURE RANGE 2303 | TASK 2304 | COOPERATION FLOW 2305 | Serial ID 2306 | COOPERA-TION TYPE 2307 | INFORMATION ON COOPERATION DESTINATION 2308 |
|---|---|---|---|---|---|---|---|
| 1 | DOCUMENT COMBINING PRINTING | User B | Scan, Box, Combine, Print | N | — | — | — |
| 2 | DOCUMENT COMBINING PRINTING | User B | Receive, Combine, Print | Y | aabbccdd 0004 | Dst | AAA/192.168.0.101 aabbccdd 0003 |
| ... | | | | | | | |

2300

IMAGE PROCESSING APPARATUS FOR EXECUTING A PROCESS FLOW, METHOD OF CONTROLLING THE SAME AND STORAGE MEDIUM

BACKGROUND OF THE INVENTION

1. Field of the Invention

The present invention relates to an image processing apparatus that is capable of registering a plurality of tasks as a series of processing flows and execute the same, a method of controlling the image processing apparatus, and a storage medium.

2. Description of the Related Art

There is provided an application which combines a plurality of tasks on documents in an image processing apparatus and registers the combined tasks as a series of processes such that by calling the series of processes, a user can execute a plurality of processes for his frequent use, without performing troublesome operations. The term "task" is intended to mean a process that can be realized by an individual function e.g. of a multifunction image processing apparatus or a process that can be realized by an application executed by an information processing apparatus or the like. For example, input and output tasks of the image processing apparatus include scanning of originals, printing of documents, transmissions (e-mail transmission, facsimile transmission, file transmission, and so forth) and storage in disks (storage in hard disks inside and outside the apparatus). Examples of edit tasks include combination of a plurality of documents, deletion of pages on documents.

A combination of a series of tasks generated for the purpose of connecting a plurality of tasks to process the same in a time-series manner is called a processing flow. This combination can be generated by various combination processes including execution of a task using the result of another task as an input thereto. In the image processing apparatus incorporating the application handling the above-described processing flows, the user depresses a button (button having a processing flow assigned thereto), whereby a processing flow associated with the button is executed.

Some of the image processing apparatuses configured as above have the function of transmitting a processing flow generated thereby to another image processing apparatus. In the image processing apparatus that receives the processing flow, a button having the processing flow assigned thereto is displayed on a UI (User Interface), and when the button is depressed by a user, the processing flow is executed. Further, it is also possible to transmit the processing flow to still another image processing apparatus from the image processing apparatus having received the processing flow. Thus, even when one image processing apparatus is replaced by another, there is no need to generate the same processing flow that has been conventionally used, on the new image processing apparatus after replacement, again.

In the above-described image processing apparatuses, however, tasks that can be analyzed and executed and settings of tasks are sometimes different depending on the type and option configuration of an apparatus, or the version of an application for handling processing flows. Therefore, when a transmitted processing flow includes a task which is not supported by a receiving-side image processing apparatus, the unsupported portion of processing flow cannot be analyzed. Let it be assumed, for example, that a processing flow is generated which includes tasks of "transmitting scanned data after giving a user certificate thereto". In this case, an image processing apparatus which does not support the function of giving a user certificate is incapable of analyzing the portion of "giving a user certificate". As a consequence, even if the apparatus attempts to execute the processing flow, it cannot carry out the portion of "giving a user certificate" only to execute processing for "transmitting scanned data" or result in a processing error.

As a solution to such an unexecutable image processing request as described above, there has been proposed a method in Japanese Patent Laid-Open Publication No. 2002-190889. In Japanese Patent Laid-Open Publication No. 2002-190889, when an image processing apparatus determines that it cannot execute a predetermined image processing request set thereto, the apparatus transfers converted image data to an image processing apparatus which is determined to be capable of using a selected and set predetermined image processing function effectively, to thereby cause the image processing apparatus to execute the request in place of itself.

However, in the method proposed in Japanese Patent Laid-Open Publication No. 2002-190889, only image data is exchanged between the image processing apparatuses, and when the same image processing request is desired to be executed by one image processing apparatus that executes the request in place of the other, it is required to set the image processing request again. It is desired that while maintaining the merit of "dispensing with troublesome operations by the user", which the above-mentioned application for handling processing flows has, it is further possible to make unexecutable processing flows executable as desired by the user without changing the contents, i.e. tasks thereof.

Furthermore, when one image processing apparatus incapable of executing a processing flow causes another image processing apparatus to execute the processing flow in place thereof, if the processing flow includes finally discharging printed sheets, there are the following concerns involving the problem of security: The other image processing apparatus which is to discharge the printed sheets is physically away from the one image processing apparatus used by the user for instructing to start the execution of the processing flow, and hence it is not easy for the user to know which image processing apparatus is to discharge the printed sheets onto a discharge tray thereof. Similarly, there is also envisaged a problem that since the printed sheets are to be discharged from the other image processing apparatus physically away from the one image processing apparatus used by the user for instructing to start the execution of the processing flow, the user is liable to leave or forget to take out the printed sheets.

SUMMARY OF THE INVENTION

The present invention provides an image processing apparatus which is capable of executing a processing flow without changing the contents thereof even when the processing flow includes a task that cannot be executed by the image processing apparatus, a method of controlling the image processing apparatus, and a storage medium storing a program for causing a computer to execute the method.

In a first aspect of the present invention, there is provided an image processing apparatus including a registration unit that registers a processing flow set by combining a plurality of processes, and an execution unit that executes the plurality of processes based on the registered processing flow, comprising a transmission unit configured to be operable when the registered processing flow includes a process that cannot be executed by the image processing apparatus, to transmit, to each of other image processing apparatuses, a request for confirming whether or not the processing flow can be executed thereby, a reception unit configured to receive a response to the request transmitted by the transmission unit, the response indicating that the processing flow can be executed, from any of the other image processing apparatuses, a decision unit configured to decide a transfer destination of the processing flow, out of the any of the other image processing apparatuses that have transmitted the response, a generation unit configured to generate from the processing flow a first cooperation processing flow including processes that can be executed by the image processing apparatus, and a second cooperation processing flow including at least one process that cannot be executed by the image processing apparatus, a transfer unit configured to transfer the second cooperation processing flow to the transfer destination decided by the decision unit, and a display unit configured to display an execution button for executing the first cooperation processing flow.

In a second aspect of the present invention, there is provided an image processing apparatus including a registration unit that registers a processing flow set by combining a plurality of processes, and an execution unit that executes the plurality of processes based on the registered processing flow, comprising a first transmission unit configured to be operable when the registered processing flow includes at least one process that cannot be executed by the image processing apparatus, to transmit, to each of other image processing apparatuses, a request for confirming whether or not the processing flow can be executed thereby, a first reception unit configured to receive a response to the request transmitted by the first transmission unit, the response indicating that the processing flow can be executed, from any of the other image processing apparatuses, a decision unit configured to decide a transfer destination of the processing flow, out of the any of the other image processing apparatuses that have transmitted the response, a generation unit configured to generate from the processing flow a first cooperation processing flow including processes that can be executed by the image processing apparatus, and a second cooperation processing flow including at least one process that cannot be executed by the image processing apparatus, a transfer unit configured to transfer the second cooperation processing flow to the transfer destination decided by the decision unit, a first display unit configured to display an execution button for executing the first cooperation processing flow, a second transmission unit configured to be operable when a user depresses the execution button for executing the first cooperation processing flow, to transmit an instruction for executing the second cooperation processing flow to the transfer destination, after the execution unit executes the first cooperation processing flow, a second reception unit configured to receive a request for confirming whether or not the processing flow can be executed, a first determination unit configured to determine whether or not the processing flow can be executed by the image processing apparatus, a third transmission unit configured to be operable when the first determination unit determines that the processing flow can be executed, to transmit the response indicating that the processing flow can be executed, to a transmission source of the request received by the second reception unit, a third reception unit configured to receive the second cooperation processing flow from the transmission source of the request, a fourth reception unit configured to receive the instruction for executing the second cooperation processing flow, a second determination unit configured to determine whether or not an execution button for executing the second cooperation processing flow is to be displayed, a second display unit configured to be operable when the second determination unit determines that the execution button is to be displayed, to display the execution button for executing the second cooperation processing flow, and a processing unit configured to execute the second cooperation processing flow when the second determination unit determines that the execution button is not to be displayed.

In a third aspect of the present invention, there is provided a method of controlling an image processing apparatus including a registration unit that registers a processing flow set by combining a plurality of processes, and an execution unit that executes the plurality of processes based on the registered processing flow, comprising transmitting, when the registered processing flow includes a process that cannot be executed by the image processing apparatus, to each of other image processing apparatuses, a request for confirming whether or not the processing flow can be executed thereby, receiving a response to the transmitted request, the response indicating that the processing flow can be executed, from any of the other image processing apparatuses, deciding a transfer destination of the processing flow, out of the any of the other image processing apparatuses that have transmitted the response, generating from the processing flow a first cooperation processing flow including processes that can be executed by the image processing apparatus, and a second cooperation processing flow including at least one process that cannot be executed by the image processing apparatus, transferring the second cooperation processing flow to the decided transfer destination, and displaying an execution button for executing the first cooperation processing flow.

In a fourth aspect of the present invention, there is provided a method of controlling an image processing apparatus including a registration unit that registers a processing flow set by combining a plurality of processes, and an execution unit that executes the plurality of processes based on the registered processing flow, comprising transmitting, when the registered processing flow includes at least one process that cannot be executed by the image processing apparatus, to each of other image processing apparatuses, a request for confirming whether or not the processing flow can be executed thereby, receiving a response to the transmitted request, the response indicating that the processing flow can be executed, from any of the other image processing apparatuses, deciding a transfer destination of the processing flow, out of the any of the other image processing apparatuses that have transmitted the response, generating from the processing flow a first cooperation processing flow including processes that can be executed by the image processing apparatus, and a second cooperation processing flow including at least one process that cannot be executed by the image processing apparatus, transferring the second cooperation processing flow to the decided transfer destination, displaying an execution button for executing the first cooperation processing flow, transmitting, when a user depresses the execution button for executing the first cooperation processing flow, an instruction for executing the second cooperation processing flow to the transfer destination, after the execution unit executes the first cooperation processing flow, receiving a request for confirming whether or not the processing flow can be executed, determining whether or not the processing flow can be executed by the image processing apparatus, transmitting, when it is determined that the processing flow can be executed, the response indicating that the processing flow can be executed, to a transmission source of the received request, receiving the second cooperation processing flow from the transmission source of the request, receiving the instruction for executing the second cooperation processing flow, determining whether or not an execution button for executing the second cooperation processing flow is to be displayed, displaying, when it is determined that the execution button is to be displayed, the execution button for executing the second cooperation processing flow, and executing the second cooperation processing flow when it is determined that the execution button is not to be displayed.

In a fifth aspect of the present invention, there is provided a storage medium storing a program for causing a computer to execute a method of controlling an image processing apparatus including a registration unit that registers a processing flow set by combining a plurality of processes, and an execution unit that executes the plurality of processes based on the registered processing flow, wherein the method comprises transmitting, when the registered processing flow includes a process that cannot be executed by the image processing apparatus, to each of other image processing apparatuses, a request for confirming whether or not the processing flow can be executed thereby, receiving a response to the transmitted request, the response indicating that the processing flow can be executed, from any of the other image processing apparatuses, deciding a transfer destination of the processing flow, out of the any of the other image processing apparatuses that have transmitted the response, generating from the processing flow a first cooperation processing flow including processes that can be executed by the image processing apparatus, and a second cooperation processing flow including at least one process that cannot be executed by the image processing apparatus, transferring the second cooperation processing flow to the decided transfer destination, and displaying an execution button for executing the first cooperation processing flow.

In a sixth aspect of the present invention, there is provided a storage medium storing a program for causing a computer to execute a method of controlling an image processing apparatus including a registration unit that registers a processing flow set by combining a plurality of processes, and an execution unit that executes the plurality of processes based on the registered processing flow, wherein the method comprises transmitting, when the registered processing flow includes at least one process that cannot be executed by the image processing apparatus, to each of other image processing apparatuses, a request for confirming whether or not the processing flow can be executed thereby, receiving a response to the transmitted request, the response indicating that the processing flow can be executed, from any of the other image processing apparatuses, deciding a transfer destination of the processing flow, out of the any of the other image processing apparatuses that have transmitted the response, generating from the processing flow a first cooperation processing flow including processes that can be executed by the image processing apparatus, and a second cooperation processing flow including at least one process that cannot be executed by the image processing apparatus, transferring the second cooperation processing flow to the decided transfer destination, displaying an execution button for executing the first cooperation processing flow, transmitting, when a user depresses the execution button for executing the first cooperation processing flow, an instruction for executing the second cooperation processing flow to the transfer destination, after the execution unit executes the first cooperation processing flow, receiving a request for confirming whether or not the processing flow can be executed, determining whether or not the processing flow can be executed by the image processing apparatus, transmitting, when it is determined that the processing flow can be executed, the response indicating that the processing flow can be executed, to a transmission source of the received request, receiving the second cooperation processing flow from the transmission source of the request, receiving the instruction for executing the second cooperation processing flow, determining whether or not an execution button for executing the second cooperation processing flow is to be displayed, displaying, when it is determined that the execution button is to be displayed, the execution button for executing the second cooperation processing flow, and executing the second cooperation processing flow when it is determined that the execution button is not to be displayed.

According to the present invention, when a processing flow includes a task that cannot be executed by the image processing apparatus, other image processing apparatuses capable of executing the processing flow are searched for, and the processing flow is transferred to an image processing apparatus that is determined as a transfer destination, whereby a button for executing the processing flow is displayed on the image processing apparatus as the transfer destination, which makes it possible to execute the processing flow as desired by a user without changing the contents of the processing flow.

Further, according to the present invention, cooperation processing flows are newly generated by dividing the processing flow. By displaying buttons for executing the cooperation processing flows, respectively, the user can execute the processing flow without changing the contents thereof not only by the image processing apparatus as the transfer destination of a processing flow but also by the image processing apparatus as a transfer source.

Further, when a final task of the processing flow is a "printing" process, in the image processing apparatus as the transfer destination, the button for executing the cooperation processing flow is also displayed on the image processing apparatus as the transfer destination so as to cause the cooperation processing flow not to be executed until the execution button is depressed. This makes it possible to prevent occurrence of an inconvenience that when the user depresses the execution button for the cooperation processing flow on the image processing apparatus as the transfer source, the printing process is immediately executed by another image processing apparatus physically away from the image processing apparatus as the transfer source, thereby undesirably causing e.g. a confidential document of the user to be left in a discharge tray. On the other hand, when the final task of the processing flow is not a printing process (transmission of a document to another apparatus, or storage of a document in an HDD, for example), the execution button for the cooperation processing flow is not displayed on the image processing apparatus as the transfer destination. In this case, at a time point when the user depresses the execution button for the cooperation processing flow on the image processing apparatus as the transfer source, the apparatus as the cooperation destination also immediately executes an associated processing flow. This makes it unnecessary for the user to move to the apparatus as the transfer destination, e.g. for log-in and depressing of a button, whereby it is possible to perform a desired processing flow only by a simple operation.

Further features of the present invention will become apparent from the following description of exemplary embodiments (with reference to the attached drawings).

BRIEF DESCRIPTION OF THE DRAWINGS

FIG. 4 is a diagram showing an example of a processing flow management file managed by the MFP 101.

FIG. 5A is a diagram showing an example of a processing flow definition file used in the image processing system shown in FIG. 1.

FIG. 5B is a diagram showing a tag extracted from the processing flow definition file in FIG. 5A.

FIG. 9A is a diagram showing an example of a first cooperation processing flow definition file.

FIG. 9B is a diagram showing a tag extracted from the first cooperation processing flow definition file in FIG. 9A.

FIG. 10A is a diagram showing an example of a second cooperation processing flow definition file.

FIG. 10B is a diagram showing a tag extracted from the second cooperation processing flow definition file in FIG. 10A.

FIG. 12 is a diagram showing an example of the processing flow management file obtained after the processing flow transfer process in FIG. 7 has been executed by the MFP 101.

FIG. 14 is a diagram showing an example of a processing flow management file obtained upon execution of the processing flow reception process in FIG. 13 by the MFP 102.

FIG. 19A is a diagram showing a second example of the processing flow definition file.

FIG. 19B is a diagram showing a tag extracted from the processing flow definition file in FIG. 19A.

FIG. 20A is a diagram showing a second example of the first cooperation processing flow definition file.

FIG. 20B is a diagram showing a tag extracted from the first cooperation processing flow definition file in FIG. 20A.

FIG. 21A is a diagram showing a second example of the second cooperation processing flow definition file.

FIG. 21B is a diagram showing a tag extracted from the second cooperation processing flow definition file in FIG. 21A.

FIG. 23 is a diagram showing an example of a processing flow management file managed by the MFP 103.

DETAILED DESCRIPTION OF THE EMBODIMENTS

The present invention will now be described in detail below with reference to the accompanying drawings showing embodiments thereof.

Figure 1:
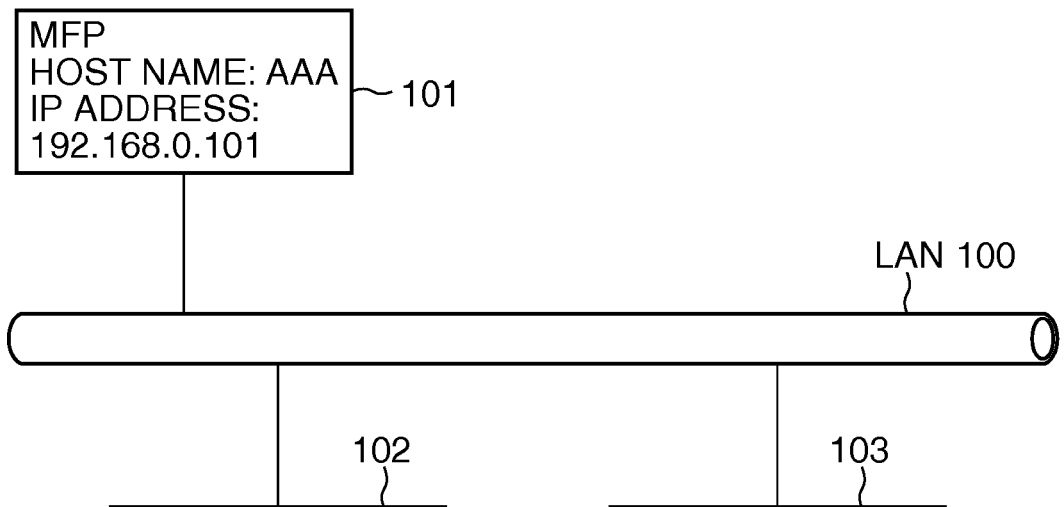
FIG. 1 is a view of an image processing system in which an image processing apparatus according to a first embodiment of the present invention is connected to a network.

FIG. 1 is a view of an image processing system in which an image processing apparatus according to a first embodiment of the present invention is connected to a network.

Referring to FIG. 1, MFPs (Multifunction Peripherals) 101, 102 and 103 are multifunction-type image forming apparatuses each as the image processing apparatus according to the first embodiment of the present invention, and are connected to a LAN 100 such that the MFPs 101, 102 and 103 are capable of communicating with each other. The MFP 101 is an image forming apparatus which is incompatible with a user certification function and a document combining function, and has a host name of AAA and an IP address of 192.168.0.101. The MFP 102 is an image forming apparatus which is compatible with the user certification function but incompatible with the document combining function, and has a host name of BBB and an IP address of 192.166.0.102. The MFP 103 is an image forming apparatus which is incompatible with the user certification function but compatible with the document combining function, and has a host name of CCC and an IP address of 192.168.0.103.

The MFPs 101, 102 and 103 have respective processing flow applications incorporated therein. The processing flow application is defined as an application that executes a processing flow set by combining a series of a plurality of image processing tasks. As described above, the image processing task means processing that can be realized by any of individual functions of e.g. an image processing apparatus of a multifunction type, and is by no means limited to image processing alone. The editing and execution of a processing flow by a processing flow application will be described hereinafter.

Although in the network environment of the example illustrated in FIG. 1, the MFPs 101, 102 and 103 are connected to the LAN 100, this is not limitative, but not only MFPs but also a plurality of other apparatuses may be connected to the LAN 100.

Figure 2:
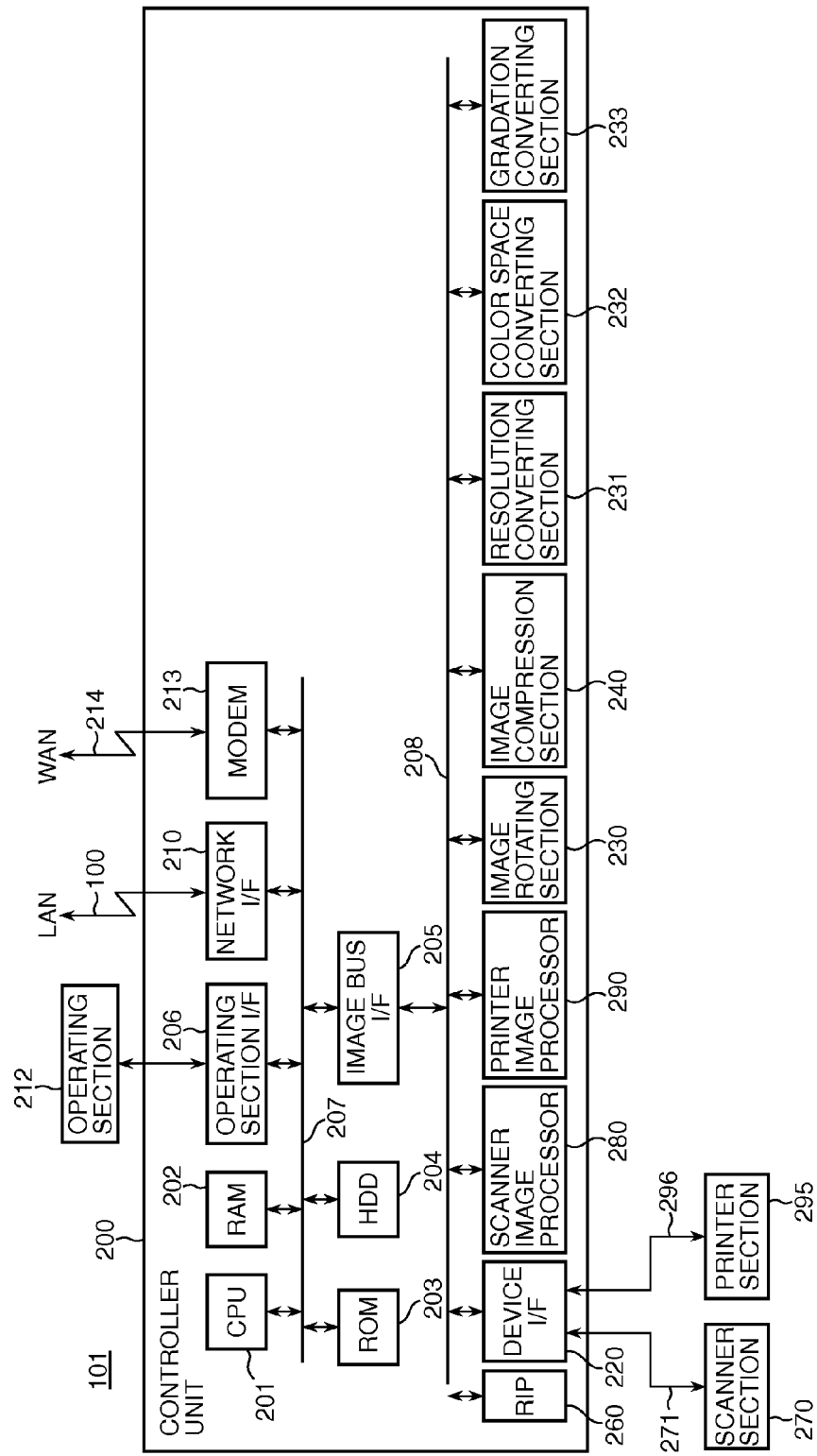
FIG. 2 is a block diagram of the internal configuration of an MFP as the image processing apparatus appearing in FIG. 1.

FIG. 2 is a block diagram showing the internal configuration of the MFP 101 appearing in FIG. 1. Since the MFPs 102 and 103 have the same internal configuration as that of the MFP 101, a description will be given of only the MFP 101.

The MFP 101 includes a controller unit 200, an operating section 212 as a UI (User Interface), a scanner section 270 as an image input device, and a printer section 295 as an image output device. The controller unit 200 is connected to the scanner section 270 and the printer section 295. Further, the controller unit 200 is connected to the LAN 100 and a public communication line (WAN) 214 to thereby receive and deliver image information and device information input.

In the controller unit 200, a CPU 201 is a controller that controls the entire system. A RAM 202 is a system working memory for operation of the CPU 201 and is also an image memory for temporarily storing image data. A ROM 203 is a boot ROM which stores a system boot program. An HDD 204 is a hard disk drive, and stores image data and software modules.

An operating section interface (I/F) 206 provides an interface between the operating section 212 and the controller unit 200, and outputs image data displayed on the operating section 212 to the operating section 212. A network interface (I/F) 210 is connected to the LAN 100, for receiving and delivering information. A modem 213 is connected to the public communication line 214, for receiving and delivering image information.

The above devices are connected to a system bus 207.

An image bus interface (I/F) 205 is a bus bridge that connects between the system bus 207 and an image bus 208 for use in high-speed transfer of image data, and performs conversion of data structure.

The following devices are connected to the image bus 208.

A raster image processor (RIP) 260 converts a PDL (Page Description Language) code into a bitmap image. A device interface (I/F) 220 connects between the scanner section 270 and the printer section 295, and the controller unit 200.

A scanner image processor 280 corrects, processes, and edits input image data. Also, the scanner image processor 280 has the function of determining whether an input image is of a color original or a monochrome original, from a chroma signal (saturation signal) of the input image, and storing the determination result. A printer image processor 290 corrects, processes, and edits output image data.

An image rotating section 230 cooperates with the scanner image processor 280 to rotate an image simultaneously when the image is read from the scanner section 270, and stores the resultant image (image data) in a memory. Further, the image rotating section 230 rotates an image (image data) stored in the memory and stores the resultant image in the memory again. Further, the image rotating section 230 is capable of printing/outputting an image stored in the memory while rotating the same in cooperation with the printer image processor 290.

A resolution converting section 231 converts the resolution of an image stored in the memory and stores the resultant image in the memory again. A color space converting section 232 carries out matrix computation to convert, for example, a YUV image stored in the memory into a Lab image and stores the resultant image data in the memory again. A gradation converting section 233 converts, for example, an 8-bit and 256-gradation image stored in the memory into a 1-bit and 2-gradation image using an error diffusion method or the like and stores the resultant image in the memory again. An image compression section 240 carries out expansion and compression processing on multivalued image data by JPEG, and binary image data by JBIG, MMR, MR, or MH.

The image rotating section 230, the resolution converting section 231, the color space converting section 232, the gradation converting section 233 and the image compression section 240 may carry out processing in cooperation with one another. For example, it is possible to continuously carry out image rotation and resolution conversion of image data stored in the memory without storing the same in the memory.

Figure 3:
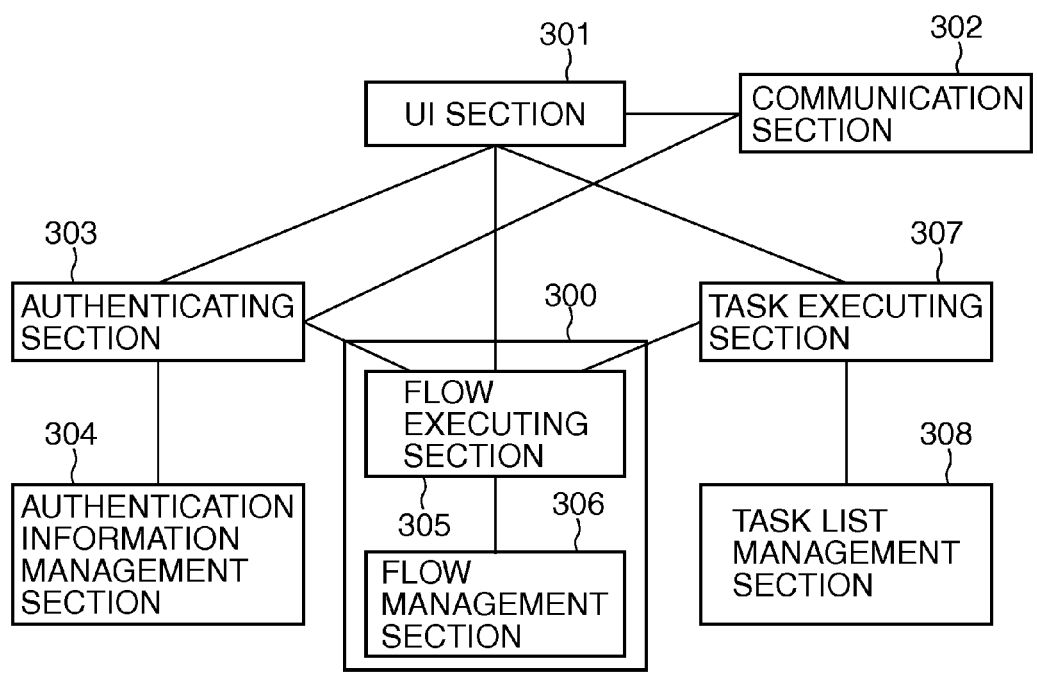
FIG. 3 is a diagram of software modules of the MFP.

FIG. 3 is a diagram of software modules of the MFP, concerning control of a combination of the functions (hereinafter referred to as the "tasks") of the MFP and a flow of processes. The illustrated software modules are executed by the CPU 201.

Referring to FIG. 3, a processing flow application 300 is comprised of a flow executing section 305 and a flow management section 306. The processing flow application 300 achieves the registration, editing and execution of a processing flow by cooperating with the other software modules in FIG. 3 (processing by a registration unit). The flow executing section 305 and the flow management section 306 will be described in detail hereinafter.

A UI section 301 is a software module that performs display on the operating section 212 via the operating section interface 206 and processes user inputs from the operating section 212. The UI section 301 displays a screen formed by the processing flow application 300 according to instructions from the processing flow application 300. Further, the UI section 301 transmits the user inputs from the operating section 212 and so forth to the processing flow application 300.

The processing flow application 300 passes the results of the user inputs transmitted from the UI section 301 to the flow executing section 305. Although in the present embodiment, the UI section 301 is a module provided outside the processing flow application 300, the UI section 301 may be integrated in the processing flow application 300.

A communication section 302 is a software module that performs communication (transmission and reception) by operating the network interface 210 or the modem 213. An authenticating section 303 performs user authentication based on user's log-in information that is input by a user who operates the operating section 212 and is accepted by the UI section 301, and user information received from the communication section 302, and manages a session of the user.

An authentication information management section 304 is a software module that manages user authentication information and responds to an inquiry of the authentication information from the authenticating section 303. Although in the present embodiment, the authentication information management section 304 has the user authentication information stored therein, the system may be configured such that an authentication server, not shown, is provided separately from the authentication information management section 304, for management of the authentication information.

The flow executing section 305 is a software module that analyzes a processing flow definition file, described hereinafter. Further, the flow executing section 305 divides the processing flow into settings (a scan job setting, a print job setting, a transmission job setting, etc.) of tasks on a function basis.

The flow management section 306 is a software module that manages a processing flow management file for determining which of processing flow execution buttons is/are displayed on the operating section 212 when a user is in a logged-in state. Further, the flow management section 306 manages the processing flow definition file that describes settings for execution of the processing flow. The processing flow management file and the processing flow definition file will be described in more detail hereinafter. In the present embodiment, a description of a processing flow is handled as a file, and the file is loaded into the RAM 202 when executing the processing flow.

A task executing section 307 is a software module that generates tasks and executes the generated tasks. A task list management section 308 is a software module that manages tasks to be executed.

Each task is generated according to a request from the UI section 301, the communication section 302, or the flow executing section 305 of the processing flow application 300. For example, when a user instructs copying or scanning via the UI section 301, settings of a copy task or a scan task are passed from the UI section 301 to the task executing section 307. On the other hand, each task is registered in the task list management section 308. The task executing section 307 sequentially executes tasks managed by the task list management section 308. Similarly, also when settings of tasks are passed from another MFP (image forming apparatus) or a PC via the communication section 302, the tasks are processed in the same manner as described above.

FIG. 4 is a diagram showing an example of a processing flow management file managed by the MFP 101.

Although in the present embodiment, the processing flow management file 400 is in the form of a table, as illustrated in FIG. 4, it may be in the form of a text file e.g. in the CSV (Comma Separated Values) format or in the XML (Extensive Markup Language). In FIG. 4, a column 401 stores respective management IDs of processing flows. A column 402 stores the respective names of the processing flows. A column 403 stores information (disclosure range) indicative of who has a right for accessing each processing flow. For example, a right for accessing a processing flow registered with an ID of 1 and executing the same is given to "User A", and a button for executing the processing flow is displayed when User A has logged in. Further, if the right for accessing a processing flow is set as "shared", the processing flow is displayed irrespective of the logged-in user.

A column 404 stores tasks that constitute each processing flow. A column 405 stores information indicative of whether or not a processing flow is to be executed in cooperation with an MFP other than the MFP 101. When a processing flow is to be executed in cooperation with an MFP other than the MFP 101 (hereinafter referred to as a "cooperation processing flow"), "Y" is stored in a box of the column 405 associated with the processing flow, whereas when the processing flow can be executed by the MFP 101 by itself, "N" is stored in the associated box of the column 405.

When "Y" is stored in the column 405, i.e. when the processing flow is a cooperation processing flow, a serial ID of the cooperation processing flow is stored in a box of a column 406 associated with the processing flow. The serial ID is automatically given only to a cooperation processing flow by the MFP 101 during generation of the cooperation processing flow, and a unique value in the network is given to the cooperation processing flow. Further, once a value is given to the cooperation processing flow during generation thereof, the value is not changed thereafter.

When the processing flow is a cooperation processing flow, information indicative of the type of cooperation of the cooperation processing flow is stored in a box of a column 407 associated with the processing flow. When the MFP 101 executes the cooperation processing flow earlier and an MFP other than the MFP 101 executes a predetermined cooperation processing flow other than the cooperation processing flow later, "Src" is stored in the associated box of the column 407. On the other hand, when the MFP other than the MFP 101 executes a predetermined cooperation processing flow other than the cooperation processing flow earlier, and then the MFP 101 executes the cooperation processing flow later, "Dst" is stored in the associated box of the column 407.

When the processing flow is a cooperation processing flow, information on an MFP as an cooperation destination is stored in a box of a column 408 associated with the processing flow. For example, the column 408 stores the host name and the IP address of the MFP as the cooperation destination, and the serial ID of the cooperation processing flow to be executed by the cooperation destination.

FIGS. 5A and 5B are diagrams showing an example of a processing flow definition file used in the image forming system in FIG. 1, FIG. 5A shows an example of the processing flow definition file, and FIG. 5B shows a tag extracted from the processing flow definition file.

In the illustrated example, it is assumed that the processing flow definition file 500 is handled as an XML file. The processing flow definition file 500 can be generated by an MFP incorporating the processing flow application 300. Further, it is assumed that tasks included in a processing flow are represented as XML tags, and the order of appearance of the tasks in the XML file is regarded as the order of processing of the tasks. In FIG. 5, details of settings configured for the tasks are omitted.

In FIG. 5A, a tag 501 indicates that a scan task is executed using the scanner section 270 to input a document. A tag 502 indicates that a user certificate is given to the document. A tag 503 indicates that a send task is executed to transmit the document to a transmission destination. A tag 504 indicates an address designated as the transmission destination in the settings of the send task. By additionally providing a tag 504 or tags 504, it is possible to set a plurality of addresses as transmission destinations. Further, for a send task, there can be set any of respective destinations of mail transmission, file transmission, such as SMB transmission, facsimile transmission, etc.

In FIG. 5B, a tag 550 (task flow tag) indicates that there is one processing flow to be executed, and is comprised of an attribute 551 representing the management ID of the processing flow and an attribute 552 representing the name of the processing flow.

Figure 6:
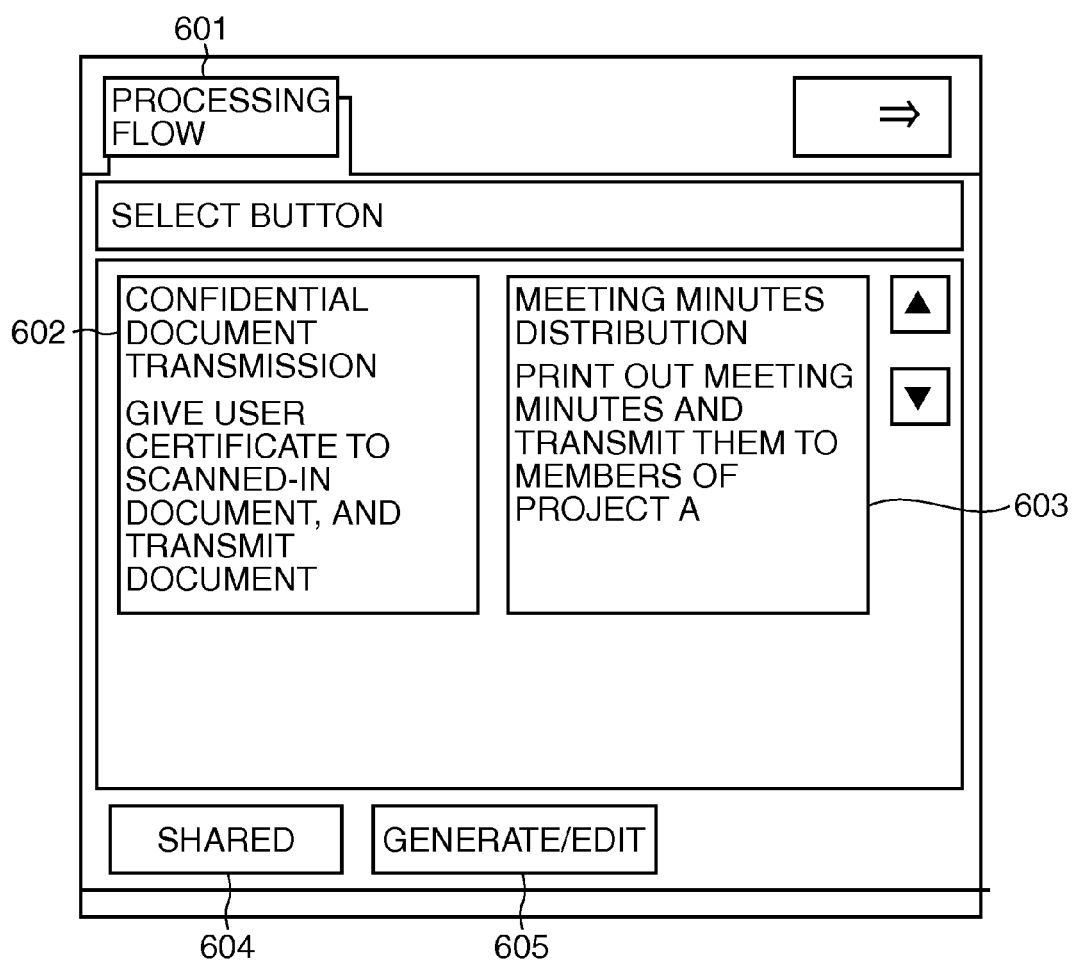
FIG. 6 is a diagram showing an example of an operation screen which is displayed on an operating section 212 of the MFP 101 when User A has logged in to the MFP 101.

FIG. 6 is a diagram showing an example of an operation screen which is displayed on the operating section 212 of the MFP 101 when User A has logged in to the MFP 101.

In FIG. 6, a button 601 is for starting the processing flow application 300 to display a screen. In the present embodiment, it is assumed that no button for starting another application is displayed.

Buttons 602 and 603 are operated for calling and executing processing flows assigned to the respective buttons. Although not shown, when User A has logged in, there are displayed respective buttons for processing flows each having "User A" set as a disclosure range in the column 403 of the processing flow management file 400, whereas when User B has logged in, there are displayed respective buttons for processing flows each having "User B" set as the disclosure range in the column 403, similarly to the case of User A.

A button 604 is for performing transition to a shared screen that is displayed irrespective of the logged-in user. Although not shown, when the button 604 is depressed, there are displayed respective buttons for processing flows each having "shared" set as the disclosure range in the column 403 of the processing flow management file 400. A button 605 is for displaying a screen for use in generating (registering) and editing a processing flow.

Figure 7:
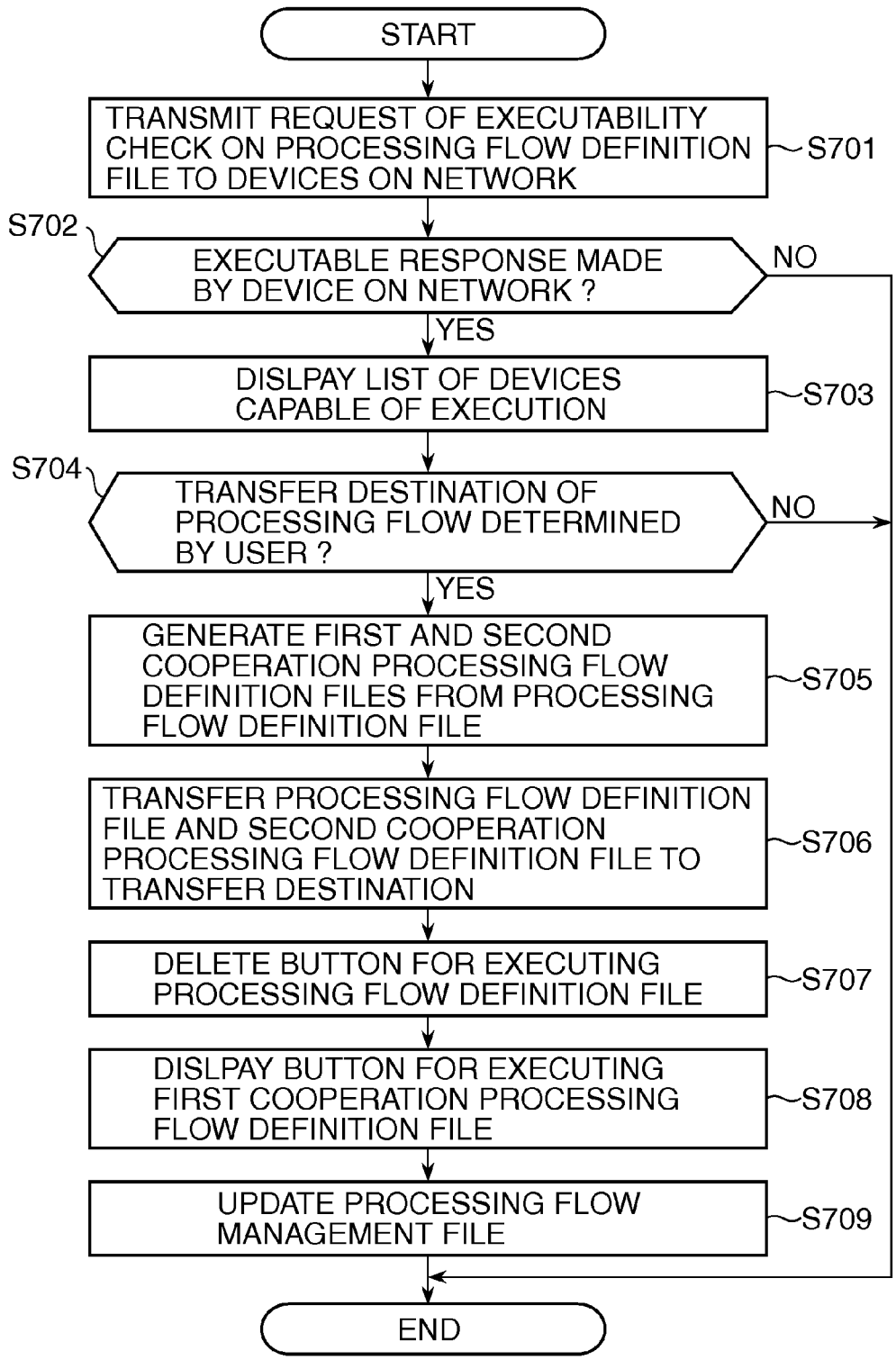
FIG. 7 is a flowchart of a processing flow transfer process executed by the MFP 101.

FIG. 7 is a flowchart of a process for transferring a processing flow, which is executed when a user depresses a button associated with the processing flow including a task that cannot be executed by the MFP 101.

In FIG. 7, steps S701 to S709 indicate processing steps of a processing flow transfer process executed by the MFP 101, and a control program implementing the processing flow transfer process is stored in the ROM 203 of the MFP 101, and is executed by the CPU 201.

In an example described hereafter with reference to FIG. 7, it is assumed that the MFP 101 executes the processing flow transfer process when User A logs in to the MFP 101 and depresses the button 602 appearing in the FIG. 6 screen.

The processing flow associated with the button 602 is described in the processing flow definition file 500 as "scanning in a document, giving a user certificate to a scanned-in document, and transmitting the document". However, as mentioned hereinabove, the MFP 101 is incompatible with the user certification function, so that it cannot execute part of the processing flow which defines "the MFP 101 gives a user certificate". In such a case, the MFP 101 broadcasts a request of executability check on the processing flow definition file 500 to the other devices (the MFPs 102 and 103 in the present embodiment) on the LAN 100, to thereby inquire of each of the other devices whether or not it can execute the processing flow definition file 500 (step S701). This step is an example of processing executed by a transmission unit in the present invention.

Next, the MFP 101 awaits reception of a response (executable response) to the above inquiry from the other devices on the LAN 100 for a predetermined time period (step S702). This step is an example of processing executed by a reception unit in the present invention. In the step S702, if there is no device that makes the executable response within the predetermined time period (NO to the step S702), the MFP 101 determines that there is no device capable of executing the processing flow definition file 500 on the LAN 100, and immediately terminates the present process.

On the other hand, if there is any device that has made an executable response within the predetermined time period (YES to the step S702), the MFP 101 displays information on the device(s) on the operating section 212 in a processing flow transfer destination candidate list (step S703). In the present embodiment, since the MFP 102 is compatible with the user certification function, as mentioned hereinabove, the MFP 101 receives an executable response from the MFP 102. Further, since the MFP 103 is incompatible with the user certification function, the MFP 103 immediately discards the request of the executability check received from the MFP 101, and makes no response to the MFP 101.

Figure 8:
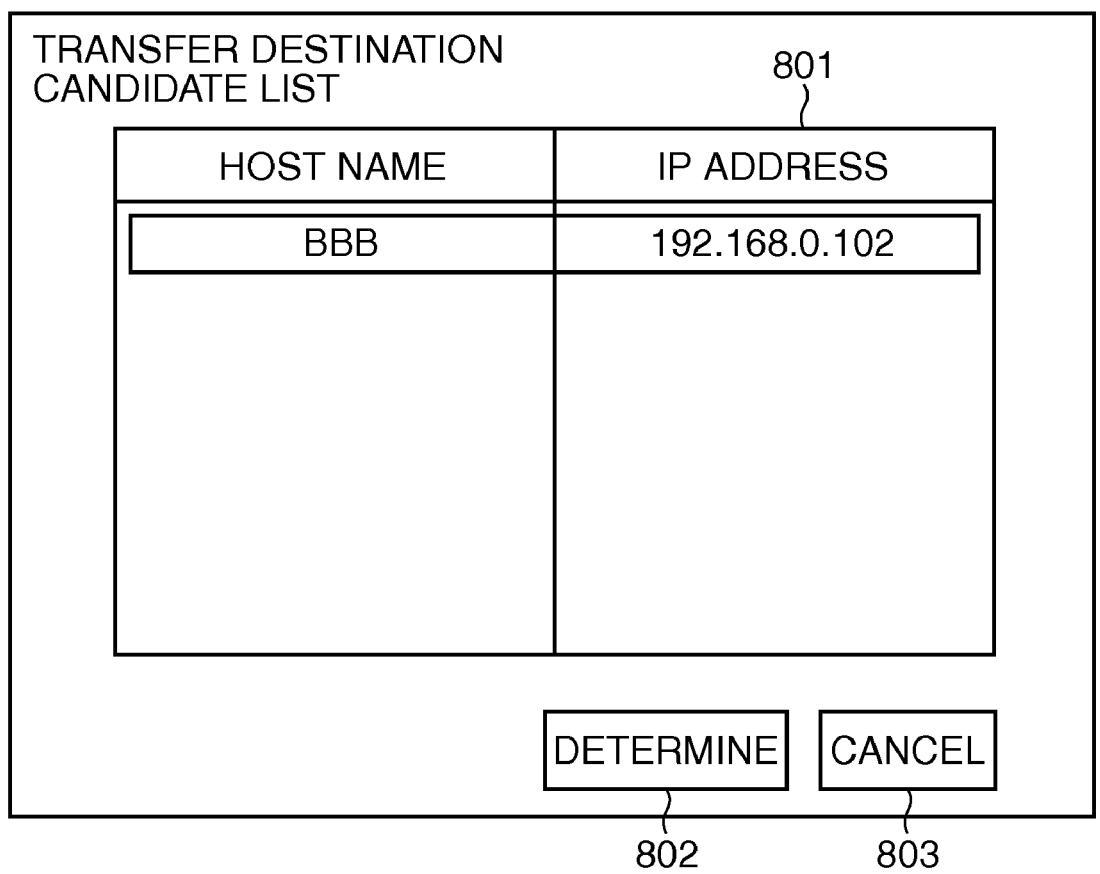
FIG. 8 is a diagram showing an example of a screen displaying a processing flow transfer destination candidate list which is displayed on the operating section of the MFP 101 during the processing flow transfer process by the MFP 101.

FIG. 8 is a diagram showing an example of a screen of a processing flow transfer destination candidate list which is displayed on the operating section 212 in the step S703.

As shown in FIG. 8, the processing flow transfer destination candidate list 801 shows the host names and the IP addresses of devices that have made the executable response in the step S702. In the present embodiment, since only the MFP 102 has made the executable response, the host name (BBB) and the IP address (192.168.0.102) of the MFP 102 are indicated.

The MFP 101 displays a screen of the processing flow transfer destination candidate list illustrated in FIG. 8 on the operating section 212, and waits for the user to determine a device to which the processing flow is to be transferred (step S704). When the user selects a desired device and depresses a determination button 802, the process proceeds to a step S705. On the other hand, when the user depresses a cancel button 803, the MFP 101 immediately terminates the present process. This step (processing) is an example of processing executed by a decision unit in the present invention.

In the step S705, the MFP 101 divides the processing flow definition file 500 to generate a first cooperation processing flow definition file 900 including only a task executable by the MFP 101 itself and a second cooperation processing flow definition file 1000 including a task that cannot be executed by the MFP 101 itself. This step is an example of processing executed by a generation unit in the present invention.

FIGS. 9A and 9B are diagrams showing examples of the first cooperation processing flow definition file 900 that the MFP 101 generates in the step S705. FIG. 9A shows the first cooperation processing flow definition file 900, and FIG. 9B shows a tag extracted from the first cooperation processing flow definition file 900.

In FIG. 9A, a tag 901, in which the contents of the tag 501 of the processing flow definition file 500 are copied as they are, indicating that a scan task using the scanner section 270 is executed to input a document. A tag 902 indicates that a send task is executed to transmit the document to a transmission destination. A tag 903 indicates an address set to the transmission destination for the send task. The IP address (192.168.0.102) of the MFP 102, which is the transmission destination of a cooperation processing flow, is set to the tag 903. A tag 904 indicates a document to be transmitted to the MFP 102. A tag 905 indicates a serial ID of the cooperation processing flow that the MFP 101 instructs the MFP 102 to execute.

The description of the tags 902 to 905 indicates processing of "transmitting data indicated by the tag 904 to a destination indicated by the tag 903, and instructing the destination to execute a cooperation processing flow indicated by the tag 905".

In FIG. 9B, a tag 950 indicates that one processing flow is executed. The tag 950 is comprised of the following attributes:

An attribute 951 represents a management ID of the processing flow. An attribute 952 represents a name of the processing flow. An attribute 953 represents a serial ID of the processing flow. An attribute 954 represents the serial ID of the cooperation processing flow to be executed by the cooperation destination.

The attributes 953 and 954 are set only for a cooperation processing flow. Unique values in the network are set as respective serial IDs thereof. In the present embodiment, it is assumed that each serial ID is formed by a twelve-digit number composed of "lower eight digits of an MAC (Media Access Control) address of an MFP (image forming apparatus)"+"a four-digit sequential number managed by the MFP". However, the serial ID is only required to be a unique value in the network, and is not necessarily required to be configured as mentioned above. The serial ID may be configured in various forms including the number of digits.

FIGS. 10A and 10B are diagrams showing examples of the second cooperation processing flow definition file 1000 that the MFP 101 generates in the step S705. FIG. 10A shows the second cooperation processing flow definition file 1000, and FIG. 10B shows a tag extracted from the second cooperation processing flow definition file 1000.

In FIG. 10A, a tag 1001 indicates that a reception task is executed to receive a document. A tag 1002, in which the contents of the tag 502 of the processing flow definition file 500 are copied as they are, indicates that a user certificate is given to the document. A tag 1003, in which the contents of the tag 503 of the processing flow definition file 500 are copied as they are, indicates that a send task is executed to transmit the document to a transmission destination. A tag 1004, in which the contents of the tag 504 of the processing flow definition file 500 are copied as they are, indicates an address set to the transmission destination for the send task.

In FIG. 10B, a tag 1050 indicates that one processing flow is executed. The tag 1050 is comprised of the following attributes:

An attribute 1051 represents a management ID of the processing flow. However, the second cooperation processing flow definition file 1000 is transferred to another MFP in a step S706 in FIG. 7, referred to hereinafter, and has an arbitrary management ID given thereto by the MFP as the transfer destination, and hence here, the management ID is not given to the attribute 1051.

An attribute 1052 represents the name of the processing flow. An attribute 1053 represents the serial ID of the processing flow. An attribute 1054 represents a serial ID of a cooperation processing flow to be executed by a cooperation source.

The attributes 1053 and 1054 are set only for a cooperation processing flow. Unique values in the network are set as respective serial IDs, as mentioned hereinabove.

As described hereinabove, the processing flow definition file 500 defines the processing flow of "scanning in a document, giving a user certificate to a scanned-in document, and transmitting the document".

However, the MFP 101 can execute the processing flow only up to "scanning in a document". Therefore, a processing flow of "scanning in a document and transmitting a scanned-in document to the MFP 102" is defined in the first cooperation processing flow definition file 900 including only a task or consecutive tasks executable by the MFP 101. Further, the second cooperation processing flow definition file 1000 formed by tasks remaining to be executed defines a processing flow of "giving a user certificate to a document received from the MFP 101 and transmitting the document" in a manner continuous to the processing defined in the first cooperation processing flow definition file 900.

Referring again to FIG. 7, in the step S706, the MFP 101 transfers the processing flow definition file 500 and the second cooperation processing flow definition file 1000 to the MFP 102 as a transfer destination of the cooperation processing flow (step S706). This step is an example of processing executed by a transfer unit in the present invention. Then, the button 602 for carrying out the processing flow definition file 500 is deleted from the FIG. 6 operation screen displayed on the operating section 212 (step S707). Further, in place of the button 602, a button 606 for executing the first cooperation processing flow definition file 900 is displayed on the operation screen displayed on the operating section 212 (step S708). This step is an example of processing executed by a display unit in the present invention. After that, the contents of the processing flow management file 400 are updated (step S709), followed by terminating the present process.

Figure 11:
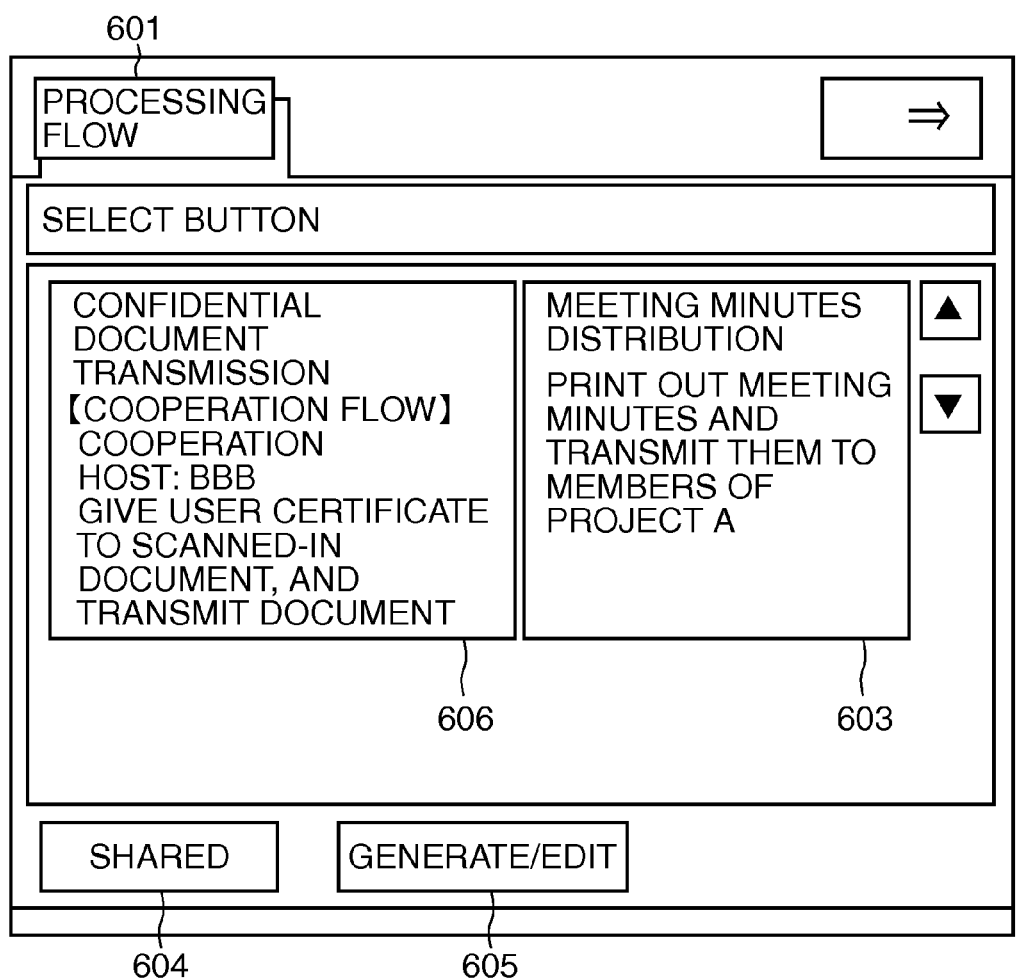
FIG. 11 is a diagram showing an example of an operation screen which is displayed on the operating section of the MFP 101 after the processing flow transfer process in FIG. 7 has been executed by the MFP 101.

FIG. 11 is a diagram showing an example of an operation screen which is displayed on the operating section 212 after the processing flow transfer process in FIG. 7 has been executed by the MFP 101. The FIG. 11 operation screen is distinguished from the FIG. 6 operation screen in that the button 606 is displayed in place of the button 602.

The button 606 is for executing the first cooperation processing flow definition file 900.

On the button 606, there are displayed words of "[COOPERATION FLOW] COOPERATION HOST: BBB" which indicates that the button 606 is for executing a processing flow in cooperation with the MFP 102.

The buttons 601, 603, 604 and 605 illustrated in FIG. 11 are not changed from those described above with reference to FIG. 6, and detailed descriptions thereof are omitted.

FIG. 12 is a diagram showing an example of the processing flow management file 400 obtained after the processing flow transfer process in FIG. 7 has been executed by the MFP 101.

In FIG. 12, as a result of execution of the processing flow transfer process in FIG. 7, a processing flow "CONFIDENTIAL DOCUMENT TRANSMISSION" is changed to the cooperation processing flow with the MFP 102. To this end, "Y" indicating that the processing flow is a cooperation processing flow is set in an associated box of the column 405.

Further, "aabbccdd0001", which is the serial ID of the cooperation processing flow, is set in an associated box of the column 406. "Src", which indicates that the cooperation processing flow is a first cooperation processing flow, i.e. that after execution of the cooperation processing flow, a cooperation processing flow associated therewith is to be executed by an MFP as a cooperation destination, is set in an associated box of the column 407.

"BBB/192.168.0.102", which indicates that the MFP as the cooperation destination is the MFP 102, is set in an associated box of the column 408. Further, "aabbccdd0002", which is the serial ID of the cooperation processing flow to be executed by the MFP 102, is also set in the box of the column 408.

Figure 13:
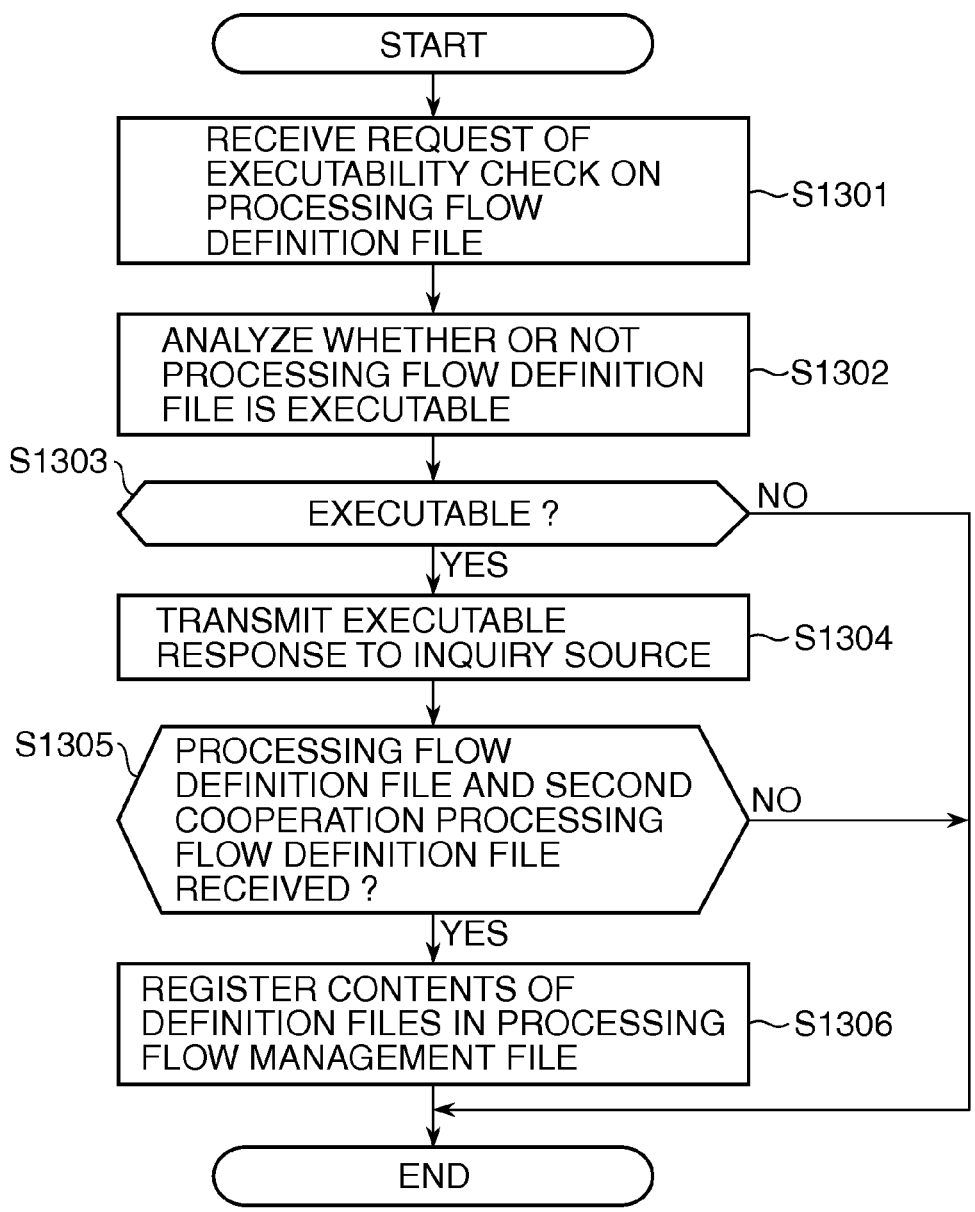
FIG. 13 is a flowchart of a processing flow reception process executed by an MFP 102 or an MFP 103.

FIG. 13 is a flowchart of a processing flow reception process executed by the MFP 102 and the MFP 103 when the MFP 101 executes the processing flow transfer process shown in FIG. 7.

In FIG. 13, steps S1301 to 1306 indicate processing steps of the processing flow reception process executed by the MFP 102 and the MFP 103 when the MFP 101 executes the step S701 of the processing flow transfer process in FIG. 7 to transmit the request of executability check on the processing flow definition file 500. A control program implementing the processing flow reception process is stored in the ROM 203 of each of the MFPs 102 and 103, and is executed by the CPU 201 of each MFP.

When the MFP 102 and the MFP 103 receive the request of executability check on the processing flow definition file 500 from the MFP 101 (step S1301), the MFP 102 and the MFP 103 analyze the processing flow definition file 500 (step S1302). This step is an example of processing executed by a request receiving unit in the present invention. Further, the MFP 102 and the MFP 103 determine whether or not all the tasks described in the processing flow definition file 500 are executable by them (step S1303). This step is an example of processing executed by a determination unit in the present invention. If there is even one unexecutable task (NO to the step S1303), the MFP 102 and the MFP 103 internally discards the request of executability check, and immediately terminate the present process.

On the other hand, if the MFP 102 and/or the MFP 103 determine(s) that all the tasks are executable (YES to the step S1303), the MFP 102 and/or the MFP 103 transmit(s) the executable response to the MFP 101 as the transmission source of the request of the executability check (step S1304). This step is an example of processing executed by a response transmitting unit in the present invention. In the present embodiment, the MFP 102 is compatible with the user certification function but the MFP 103 is incompatible therewith. Therefore, the MFP 102 determines that the processing flow definition file 500 is executable by itself, and transmits the executable response to the MFP 101. In contrast, the MFP 103 determines that it cannot perform the task of giving a user certificate, out of the tasks described in the processing flow definition file 500, and internally discards the request of the executability check therein to make no response to the MFP 101.

Next, the MFP 102 awaits reception of the processing flow definition file and the second cooperation processing flow definition file from the MFP 101 for a predetermined time period (step S1305). When the MFP 102 does not receive the processing flow definition file and the second cooperation processing flow definition file from the MFP 101 within the predetermined time period, the MFP 102 immediately terminates the present process. In the present embodiment, it is assumed that the MFP 101 executes the process in the step S706 within the predetermined time period.

Upon reception of the processing flow definition file 500 and the second cooperation processing flow definition file 1000, the MFP 102 registers the contents of the files 500 and 1000 in a processing flow management file 1400, described hereinafter (step S1306), followed by terminating the present process. This step is an example of processing executed by a processing flow receiving unit in the present invention. When the processing flow definition file 500 is received, a management ID set in the attribute 551 of the tag 550 thereof has a value for internal management of the file 500 by the MFP 101. Therefore, the MFP 102 resets the attribute 551 to a value of the management ID optimum for internal management of the file 500 thereby. Similarly, the MFP 102 also set the attribute 1051 of the tag 1050 of the second cooperation processing flow definition file 1000 to an optimum management ID.

FIG. 14 is a diagram showing an example of the processing flow management file which is obtained after execution of the processing flow reception process in FIG. 13 by the MFP 102, and is managed by the MFP 102.

Although in the present embodiment, the processing flow management file 1400 is in the form of a table, as illustrated in FIG. 14, it may be in the form of a text file e.g. in the CSV format or in the XML.

Referring to FIG. 14, a column 1401 stores management IDs of processing flows. A column 1402 stores the respective names of the processing flows. A column 1403 stores information (disclosure range) indicative of who has a right for accessing each processing flow. For example, a right for accessing a processing flow registered with an ID of 1 is given to "User A" and a button for executing the processing flow is displayed when User A has logged in, as described above. Further, if the right for accessing a processing flow is set as "shared", the processing flow is displayed irrespective of the logged-in user.

A column 1404 stores tasks that constitute each processing flow. A column 1405 stores information indicative of whether or not the processing flow is a cooperation processing flow. If the processing flow is a cooperation processing flow, "Y" is stored in a box of the column 1405 associated with the processing flow, whereas when the processing flow can be executed by the MFP by itself, "N" is stored in the associated box of the column 1405.

When "Y" is stored in the column 1405, i.e. when the processing flow is a cooperation processing flow, a serial ID of the cooperation processing flow is stored in a box of a column 1406 associated with the processing flow.

When the processing flow is a cooperation processing flow, information indicative of the type of cooperation of the cooperation processing flow is stored in a box of a column 1407 associated with the processing flow. When the cooperation processing flow is a first cooperation processing flow, i.e. when the MFP 102 executes the cooperation processing flow earlier and an MFP other than the MFP 102 executes a predetermined cooperation processing flow other than the cooperation processing flow later, "Src" is stored in the associated box of the column 1407. On the other hand, when the cooperation processing flow is a second cooperation processing flow, i.e. when the MFP other than the MFP 102 executes a predetermined cooperation processing flow other than the cooperation processing flow earlier, and then the MFP 102 executes the cooperation processing flow later, "Dst" is stored in the associated box of the column 1407.

When the processing flow is a cooperation processing flow, information on an MFP as an cooperation destination is stored in a box of a column 1408 associated with the processing flow. For example, in the associated box of the column 1408, there are set the host name and the IP address of the MFP as the cooperation destination, and the serial ID of the cooperation processing flow to be executed by the cooperation destination. Here, the processing flow registered with an ID of 1 corresponds to the processing flow definition file 500, and a processing flow registered with an ID of 2 corresponds to the second cooperation processing flow definition file 1000. Since the processing flow definition file 500 defines a processing flow executable by the MFP 102 by itself, "N" is stored in the associated box of the column 1405.

On the other hand, the second cooperation processing flow definition file 1000 defines a cooperation processing flow which is to be executed in cooperation with the MFP 101 and is executed in association with the first cooperation processing flow definition file 900 executed by the MFP 101. Therefore, "Y" is stored in the associated box of the column 1405. Further, since the second cooperation processing flow definition file 1000 is executed in a sequence of MFP 101→MFP 102, "Dst" is stored in the associated box of the column 1407. Further, the host name (AAA) and the IP address (192.168.0.101) of the MFP 101 as a cooperation partner are stored in the associated box of the column 1408.

Figure 15:
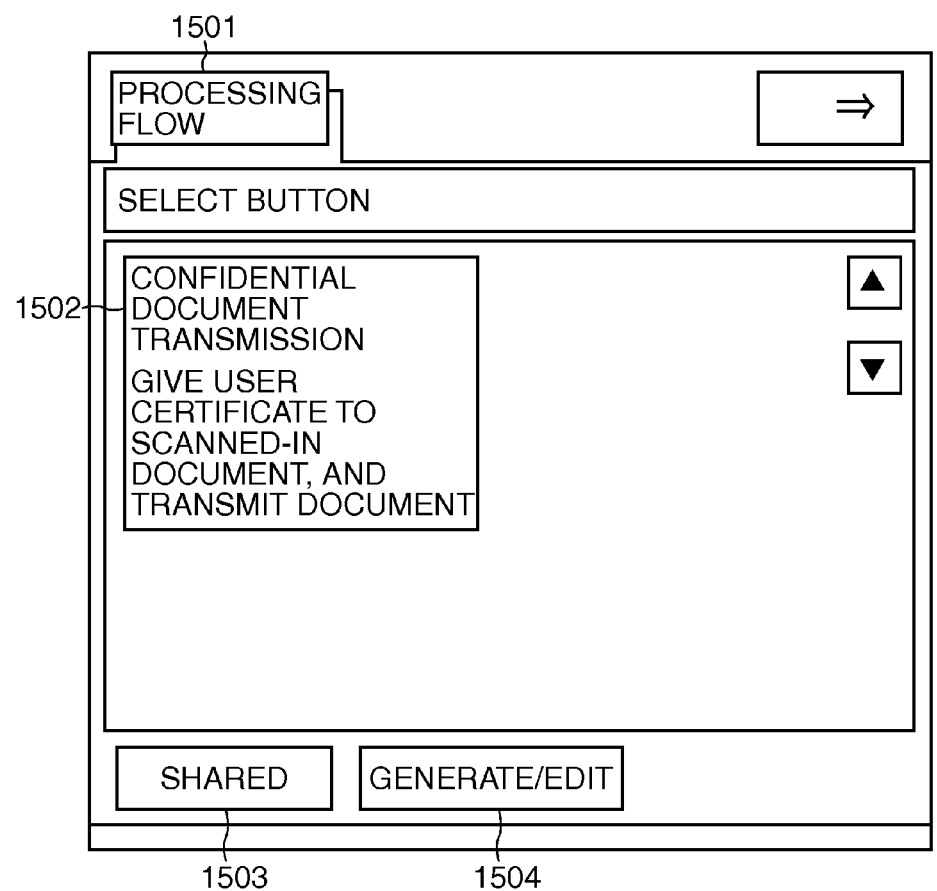
FIG. 15 is a diagram showing an example of an operation screen of the MFP 102 which is displayed when User A has logged in to the MFP 102.

FIG. 15 is a diagram showing an example of an operation screen which is displayed on the operating section 212 of the MFP 102 when User A has logged in to the MFP 102.

In FIG. 15, a button 1501 is for starting the processing flow application 300 to display a screen. In the present embodiment, it is assumed that no button for starting another application is displayed. A button 1502 is for calling and executing a processing flow assigned thereto.

A button 1503 is for performing transition to a shared screen that is displayed irrespective of the logged-in user. A button or buttons (not shown) displayed when the button 1503 is depressed is/are for a processing flow or processing flows for which the disclosure range in the column 1403 of the processing flow management file 1400 is set to "shared".

A button 1504 is for displaying a screen for use in generating and editing a processing flow.

Although not shown, when User A has logged in, there are displayed respective buttons for processing flows each having "User A" set as the disclosure range in the column 1403 of the processing flow management file 1400, whereas when User B has logged in, there are displayed respective buttons for processing flows each having "User B" set as the disclosure range in the column 1403, similarly to the case of User A. However, even when a cooperation processing flow has "User A" set as the disclosure range in the column 1403, the cooperation processing flow is not displayed as a button if it satisfies all the following conditions: "Y" is set as a cooperation flow in the column 1405; "Dst" is as a type of cooperation in the column 1407, and further a task other than "Print" is set as a final task in the column 1404.

Assuming that the final task of the cooperation processing flow is e.g. "Send" other than "Print", the cooperation processing flow is automatically executed after execution of the first cooperation processing flow by an MFP as a cooperation source, using the execution thereof as a trigger. Therefore, no button e.g. for "Send" is displayed since User A is not required to depress a button on the operation screen displayed on the operating section 212 of the MFP 102 in FIG. 15.

On the other hand, if the final task of the cooperation processing flow is "Print", a button therefor is displayed. In this case, after the first cooperation processing flow has been executed by the MFP as the cooperation source, when User A comes to the MFP 102 to log in to the MFP 102 and depresses an associated button, the cooperation processing flow is executed.

Figure 16:
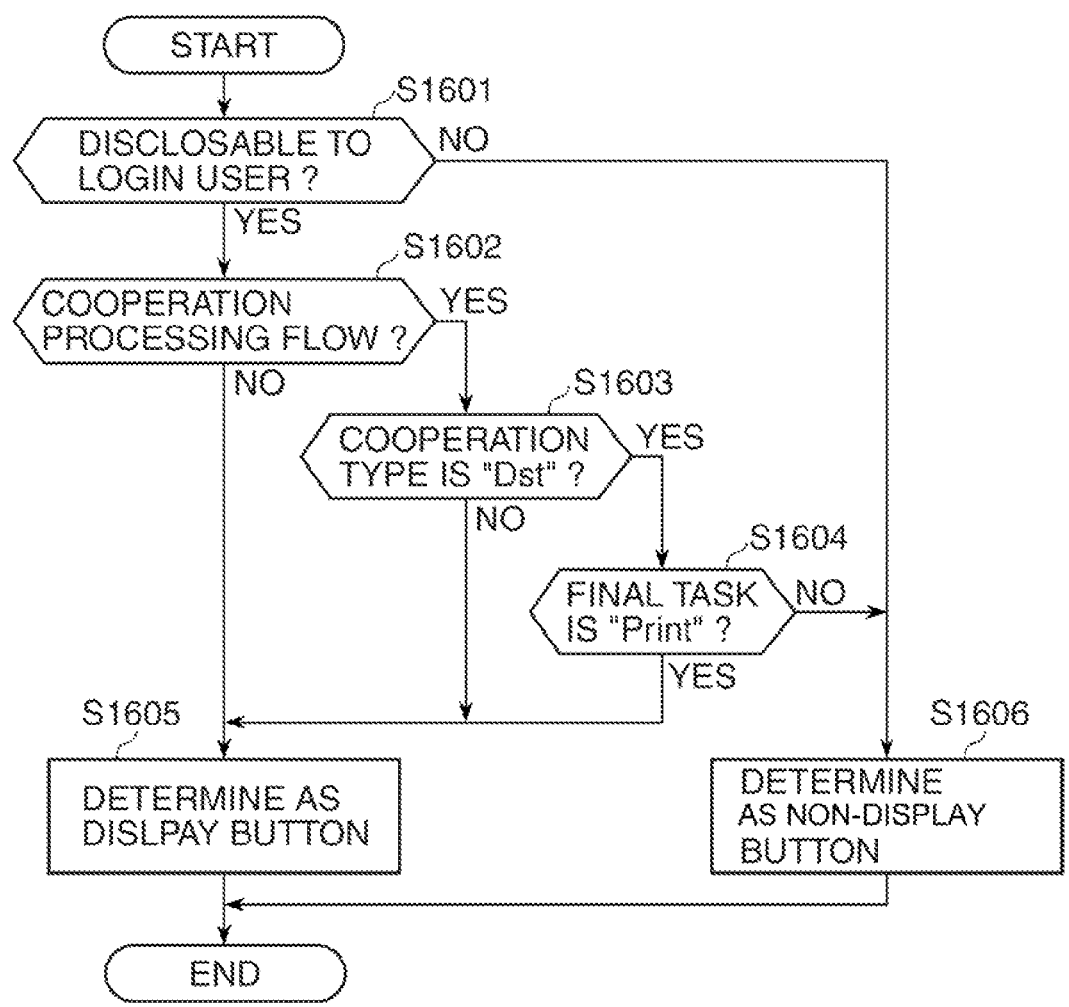
FIG. 16 is a flowchart of a button display-determining process executed by an MFP.

FIG. 16 is a flowchart of a button display-determining process which is executed by an MFP according to a login user.

In FIG. 16, steps S1601 to 1606 indicate processing steps of the button display-determining process for determining whether or not a button for causing a MFP to execute a processing flow is to be displayed on the operation screen of the operating section 212 of the MFP.

As a result of execution of the present process, a button determined as a "display button" is displayed on the operation screen of the operating section 212, whereas as a result of execution of the present process, a button determined as a "non-display button" is not displayed on the operation screen of the operating section 212. Further, a control program implementing the button display-determining process is stored in the ROM 203 of each MFP, and is executed by the CPU 201 thereof. Here, the steps S1601 to 1606 will be described by taking a case where the MFP 102 performs the button display-determining process as an example.

When a user has logged in to the MFP 102, the MFP 102 determines with reference to the processing flow management file 1400 whether or not, for each of registered processing flows, a disclosure range set in the column 1403 matches the login user (step S1601).

As a result of the determination, if the disclosure range does not match the login user (NO to the step S1601), a button for executing the processing flow is determined as a "non-display button" (step S1606), followed by terminating the present process.

On the other hand, as a result of the determination in the step S1601, if the disclosure range matches the login user (YES to the step S1601), the MFP 102 determines based on the content of the associated box of the column 1405 whether or not the processing flows is a cooperation processing flow (step S1602). If it is determined that the processing flow is not a cooperation processing flow (NO to the step S1602), a button for executing the processing flow is determined as a "display button" (step S1605), followed by terminating the present process.

On the other hand, if it is determined in the step S1602 that the processing flow is a cooperation processing flow, the process proceeds to a step S1603, wherein it is determined based on the type of cooperation of the cooperation processing flow set in the associated box of the column 1407 whether or not the cooperation processing flow is executed in a sequence of "other MFP 101"→"MFP 102", that is, the cooperation processing flow is a second cooperation processing flow. If it is determined that the cooperation processing flow is not the second cooperation processing flow (NO to the step S1603), a button for executing the processing flow is determined as a "display button" (step S1605), followed by terminating the present process.

On the other hand, if it is determined in the step S1603 that the cooperation processing flow is a second cooperation processing flow, it is further determined based on the content of the associated box of the column 1404 whether or not the final task of the cooperation processing flow is "Print" (printing process) (step S1604). If it is determined that the final task is "Print" (YES to the step S1604), a button for executing the cooperation processing flow is determined as a "display button" (step S1605), followed by terminating the present process.

On the other hand, if it is determined that the final task is processing (e.g. "Send") other than "Print" (NO to the step S1604), a button for executing the cooperation processing flow is determined as a "non-display button" (step S1606), followed by terminating the present process. As described above, it is determined whether or not a button is to be displayed, depending on whether or not the final task of the second cooperation processing flow is a printing process.

As described hereinabove, the processing flow for "scanning in a document, giving a user certificate to a scanned-in document, and transmitting the document" is transferred from an initially registered device (MFP 101) incapable of executing the processing flow to another device (MFP 102) capable of executing the processing flow. Further, the processing flow is also registered in the MFP 101 as a cooperation processing flow. This enables the user to carry out the above-described desired processing flow without changing its contents, not only by the MFP 102 but also by the MFP 101.

Next, a description will be given of operation processes of processing flows executed by MFPs.

Figure 17:
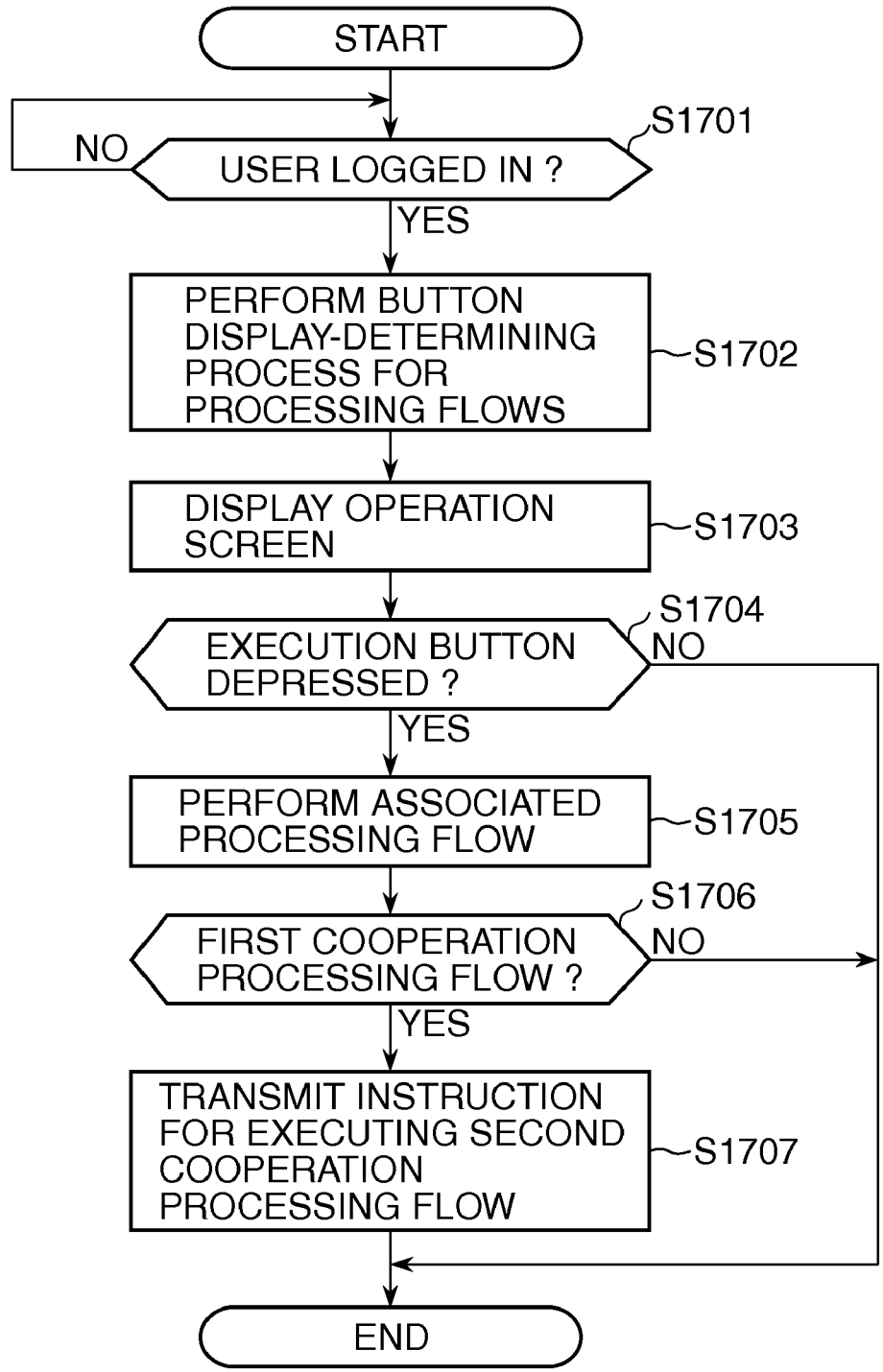
FIG. 17 is a flowchart of a processing flow-executing process executed by an MFP.

FIG. 17 is a flowchart of a processing flow-executing process executed by an MFP as the image processing apparatus according to the first embodiment.

In FIG. 17, steps S1701 to 1707 indicate processing steps of the processing flow-executing process executed by the MFP. Further, a control program implementing the processing flow-executing process is stored in the ROM 203 of each MFP, and is executed by the CPU 201 thereof.

First, the steps S1701 to 1707 will be described by taking an operation process which is executed by the MFP 102 when User A wishes to cause the MFP 102 to execute a processing flow, as an example.

The MFP 102 awaits occurrence of login by a user (step S1701). Now, let it be assumed that User A has logged in. Then, the MFP 102 performs the button display-determining process in FIG. 16, for the processing flows registered in the processing flow management file 1400 managed by the MFP 102 (step S1702). As a result of the button display-determining process, the MFP 102 displays the FIG. 15 operation screen for User A on the operating section 212 (step S1703).

Next, the MFP 102 waits for depression of the button 1502 for executing the associated processing flow by User A on the FIG. 15 operation screen (step S1704). Here, when it is detected that User A has logged out by depressing a logout key, not shown, without depressing the button 1502, the MFP 102 immediately terminates the present process.

When the MFP 102 detects depression of the button 1502 in the step 1704, the MFP 102 executes the contents of the processing flow definition file 500 associated with the button 1502 (step S1705). Next, the MFP 102 determines whether or not the present processing flow is a first cooperation processing flow (step S1706). Here, since the processing flow definition file 500 associated with the button 1502 is not a first cooperation processing flow, the MFP 102 immediately terminates the present process.

Similarly, the steps S1701 to 1707 will be described by taking an operation process of the MFP 101 which is executed when User A wishes to cause the MFP 101 to execute a processing flow, as an example.

The MFP 101 awaits occurrence of login by a user (step S1701). Now, let it be assumed that User A has logged in. Then, the MFP 101 performs the button display-determining process in FIG. 16, for the processing flows registered in the processing flow management file 400 managed by the MFP 101 (step S1702). As a result of the button display-determining process, the MFP 101 displays the FIG. 11 operation screen for User A on the operating section 212 (step S1703).

Next, the MFP 101 waits for depression of the button 603 or 606 for executing the associated processing flow by User A on the FIG. 11 operation screen (step S1704). Here, when it is detected that User A has logged out by depressing a logout key, not shown, without depressing the button 603 or 606, the MFP 101 immediately terminates the present process. In the illustrated example, it is assumed that User A has depressed the button 606.

When the MFP 101 detects depression of the button 606 in the step 1704, the MFP 101 executes the contents of the first cooperation processing flow definition file 900 associated with the button 606 (step S1705). As described above, the first cooperation processing flow is defined in the first cooperation processing flow definition file 900 (step S1706). Therefore, the MFP 101 transmits an instruction for executing the second cooperation processing flow definition file 1000 to the MFP 102 as a cooperation destination (step S1707). This step is an example of processing executed by a transmission unit in the present invention. After execution of the above-described steps, the MFP 101 terminates the present process.

As described hereinabove, as to a processing flow executable by an MFP by itself, such as that defined by the processing flow definition file 500 assuming that it is in the MFP 102, the processing flow is executed by depressing a button associated therewith until it is completed. On the other hand, as to a cooperation processing flow that is to be executed in cooperation with another MFP, such as that defined by the first cooperation processing flow definition file 900 for the MFP 101, only tasks consecutively executable by the MFP are executed by depressing a button associated with the cooperation processing flow. An instruction for executing the remaining portion of the cooperation processing flow, formed by tasks to be executed after the executable tasks, is transmitted from the MFP to the other MFP as the cooperation destination.

Figure 18:
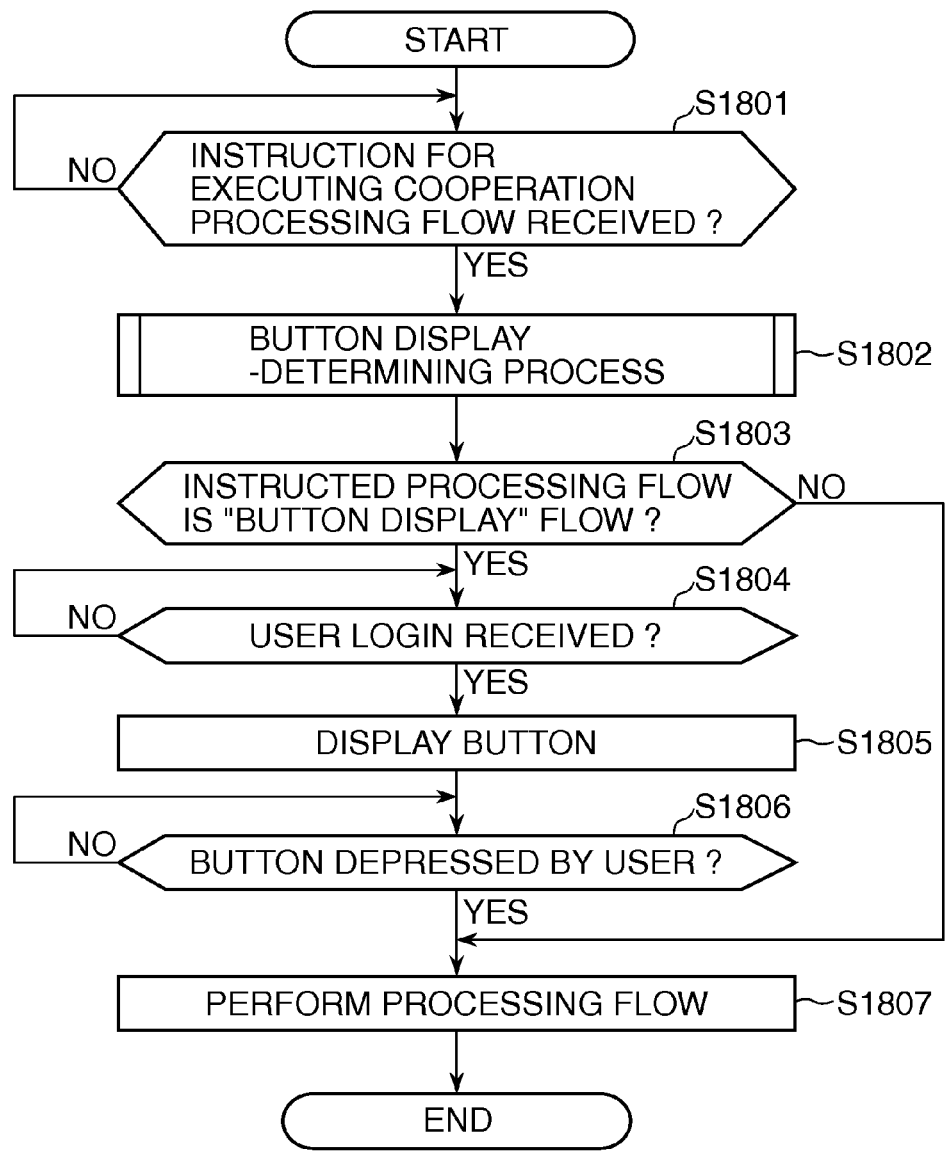
FIG. 18 is a flowchart of a cooperation processing flow-executing process executed by the MFP 102 and the MFP 103.

FIG. 18 is a flowchart of a cooperation processing flow-executing process which is executed by each of the MFPs 102 and 103 as cooperation destinations upon reception of an instruction for executing a predetermined cooperation processing flow from the MFP 101 as a cooperation source.

In FIG. 18, steps S1801 to 1807 indicate processing steps of the cooperation processing flow-executing process executed by the MFPs 102 and 103 as the cooperation destinations. A control program implementing the cooperation processing flow-executing process is stored in the ROM 203 of each of the MFPs 102 and 103 as the cooperation destinations, and is executed by the CPU 201 thereof.

The MFPs (here, the MFPs 102 and 103) each await reception of the instruction for executing a cooperation processing flow from another MFP (here, MFP 101) (step S1801). This step is an example of processing executed by an execution instruction-receiving unit in the present invention. Upon reception of the execution instruction, the MFP performs the button display-determining process in FIG. 16 for the cooperation processing flow instructed to be executed, with reference to the processing flow management file (step S1802). Then, the MFP determines whether or not a button for the cooperation processing flow is a "display button" (step S1803). As a result of the determination, if the MFP determines that the button is a "non-display button", it immediately executes the cooperation processing flow (step S1807), followed by terminating the present process.

On the other hand, if the MFP determines in the step S1803 that the button is a "display button", it waits for the user to log in (step S1804). When the user has logged in, the MFP displays the button for executing the cooperation processing flow (step S1805). This process is an example of an execution button display unit in the present invention. Then, the MFP waits for the user to depress the button (step S1806), and when the user depresses the button, the MFP executes the cooperation processing flow (step S1807). This process is an example of a second cooperation processing flow executing unit in the present invention. After execution of the above-described steps, the MFP terminates the present process.

Next, the cooperation processing flow-executing process in FIG. 18 will be described by applying the same to the operation process of the MFP 102 which is executed when the MFP 101 executes the processing flow-executing process in FIG. 17 and instructs the MFP 102 to execute the second cooperation processing flow definition file 1000 associated with the first cooperation processing flow definition file 900.

The MFP 102 receives the instruction for executing a cooperation processing flow having a serial ID of "aabbccdd0002" from the MFP 101 (step S1801). It is understood with reference to the processing flow management file 1400 that a cooperation processing flow associated with the serial ID of "aabbccdd0002" is registered with a management ID of "2". When the cooperation processing flow having the management ID of "2" is subjected to the button display-determining process in FIG. 16 (step S1802), it is understood from the content of an associated box of the column 1404 that the final task of the cooperation processing flow is not "Print", and it is determined that a button therefor is a "non-display button" (NO to the step S1803). Therefore, the MFP 102 immediately executes the processing flow of "giving a user certificate to a document received from the MFP 101 and transmitting the document", which is the content of the second cooperation processing flow definition file 1000 (step S1807).

The operation processes of the MFPs in the present embodiment are described by taking the processing flow of "scanning in a document, giving a user certificate to a scanned-in document, and transmitting the document" as an example.

Next, the operation processes of the MFPs in the present embodiment will be further described by taking another new processing flow of "scanning in a document, combining a scanned-in document and a document stored in the HDD, and printing the combined document" as an example. Here, attention is paid to a "document combining printing" processing flow. This processing flow is registered in the MFP 101 as a management ID of 3 in FIG. 4, and the disclosure range thereof is set to User B.

FIGS. 19A and 19B are diagrams showing an example of a processing flow definition file of the "document combining printing" processing flow. FIG. 19A shows the processing flow definition file of the "document combining printing" processing flow. FIG. 19B shows a tag extracted from the processing flow definition file.

In the present embodiment, it is assumed that the processing flow definition file 1900 is an XML file. This processing flow definition file can be generated by an MFP incorporating the processing flow application 300. Further, it is assumed that tasks included in the processing flow are represented as XML tags, and the order of appearance of the tasks in the XML file is regarded as the order of processing of the tasks. In FIG. 19, details of settings configured for the tasks are omitted.

In FIG. 19A, a tag 1901 indicates that a scan task is executed using the scanner section 270 to input a document. A tag 1902 indicates that image data stored in the HDD 204 is handled as an input document. A tag 1903 specifies the image data stored in the HDD 204.

A tag 1904 indicates that a task for combining documents is carried out to combine a plurality of documents into a single document. A tag 1905 specifies documents to be combined. A tag 1906 indicates that a printing task is executed to print the document.

In FIG. 19B, a tag 1950 indicates that one processing flow is executed, and is comprised of an attribute 1951 representing the management ID of the processing flow and an attribute 1952 representing the name of the processing flow.

Here, in the present embodiment, the MFP 101 is an image forming apparatus which is incompatible with the document combining function. Therefore, when User B has logged in to the MFP 101 and depresses an execution button associated with the processing flow definition file 1900, the MFP 101 carries out the processing flow transfer process in FIG. 7 to attempt to transfer the processing flow to another MFP that can perform the processing flow. More specifically, first, the MFP 101 broadcasts a request of executability check on the processing flow definition file 1900 to the other devices on the LAN 100 (step S701), and waits for reception of an executable response from any MFP on the LAN 100 (step S702). In the present embodiment, since the MFP 103 is compatible with the document combining function, it is assumed that the MFP 103 transmits the executable response of the processing flow definition file 1900 to the MFP 101.

Next, the MFP 101 displays MFPs that can perform the processing flow, in a list form (step S703), and waits for the user to determine a transfer destination of the processing flow (step S704). In the present embodiment, it is assumed that only the MFP 103 is displayed as the MFP capable of performing the processing flow, in the list in the step S703, and the user determines the MFP 103 as the transfer destination of the processing flow in the step S704.

Then, the MFP 101 divides the processing flow definition file 1900 to generate a first cooperation processing flow definition file 2000, described hereinafter, and a second cooperation processing flow definition file 2100, described hereinafter (step S705). After that, the MFP 101 transfers the processing flow definition file 1900 and the second cooperation processing flow definition file 2100 to the MFP 103 (step S706).

Next, the MFP 101 deletes the execution button associated with the processing flow definition file 1900 (step S707), and displays an execution button associated with the first cooperation processing flow definition file 2000 (step S708). Finally, the MFP 101 updates the contents of the processing flow management file 400 (step S709), followed by terminating the present process.

In the meanwhile, the MFP 103 executes the processing flow reception process in FIG. 13. More specifically, when the MFP 103 receives the request of the executability check on the processing flow definition file 1900 from the MFP 101 (step S1301), the MFP 103 analyses the processing flow (step S1302) and determines whether or not the MFP 103 can perform the processing flow (step S1303). In the present embodiment, since the MFP 103 is capable of executing the processing flow definition file 1900, the MFP 103 transmits the executable response to the MFP 101 (step S1304). After that, the MFP 103 waits for reception of the processing flow definition file 1900 and the second cooperation processing flow definition file 2100 from the MFP 101 (step S1305). Upon reception of the two processing flow definition files, the MFP 103 registers the contents thereof in the processing flow management file (step S1306), followed by terminating the present process.

Similarly, the MFP 102 as well executes the processing flow reception process shown in FIG. 13. More specifically, when the MFP 102 receives the request of the executability check on the processing flow definition file 1900 from the MFP 101 (step S1301), the MFP 102 analyses the processing flow (step S1302) and determines whether or not the MFP 102 can perform the processing flow (step S1303). In the present embodiment, however, the MFP 102 is incompatible with the document combining function and determines that it cannot execute the processing flow definition file 1900, so that the MFP 102 internally discards the request of the executability check, and immediately terminates the present process.

As described heretofore, the processing flow for "scanning in a document, combining a scanned-in document and a document stored in the HDD, and printing the combined document" is also transferred from a initially registered device (MFP 101) incapable of executing the processing flow to another device (MFP 103) capable of executing the processing flow. Further, the processing flow is also registered in the MFP 101 as a cooperation processing flow. This enables the user to carry out the above-described desired processing flow without changing its contents, not only by the MFP 103 but also by the MFP 101.

FIGS. 20A and 20B and FIGS. 21A and 21B show the first cooperation processing flow definition file 2000 and the second cooperation processing flow definition file 2100, respectively, which are generated in the step S705 by dividing the processing flow definition file.

In the first cooperation processing flow definition file 2000 shown in FIG. 20A, a tag 2050 indicates that one processing flow is executed. The tag 2050 is comprised of the following attributes:

In FIG. 20B, an attribute 2051 represents the management ID of the processing flow. An attribute 2052 represents the name of the processing flow. An attribute 2053 represents the serial ID of the processing flow. An attribute 2054 represents the serial ID of a cooperation processing flow as a cooperation destination.

The attributes 2053 and 2054 are set only for a cooperation processing flow executed by the MFP 101 in cooperation with another MFP. Unique values in the network are set as respective serial IDs thereof. In the present embodiment, it is assumed that each serial ID is formed by a twelve-digit number composed of "lower eight digits of an MAC (Media Access Control) address of an MFP"+"a four-digit sequential number managed by the MFP". However, the serial ID is only required to be a unique value in the network, and is not necessarily required to be configured as mentioned above. The serial ID may be configured in various forms including the number of digits.

In FIG. 20A, a tag 2001, in which the contents of the tag 1901 of the processing flow definition file 1900 are copied as they are, indicates that a scan task using the scanner section 270 is executed to input a document. A tag 2002, in which the contents of the tag 1902 of the processing flow definition file 1900 are copied as they are, indicates that image data stored in the HDD 204 is handled as an input document.

A tag 2003, in which the contents of the tag 1903 of the processing flow definition file 1900 are copied as they are, specifies the image data stored in the HDD 204. A tag 2004 indicates that a send task is executed to transmit a document to a transmission destination. A tag 2005 indicates an address that is set to the transmission destination by configuration of the send task. The IP address (192.168.0.103) of the MFP 103, which is the transmission destination of the cooperation processing flow, is set in the tag 2005. tag 2006 indicates a document to be transmitted to the MFP 103. A tag 2007 indicates the serial ID of the cooperation processing flow that the MFP 101 instructs the MFP 103 to execute.

The description of the tags 2004 to 2007 indicates processing of "transmitting the data indicated by the tag 2006 to the destination indicated by the tag 2005, and instructing the destination to execute the cooperation processing flow indicated by the tag 2007". Similarly, in the second cooperation processing flow definition file 2100 shown in FIG. 21A, a tag 2150 indicates that one processing flow is executed. The tag 2150 is comprised of the following attributes:

In FIG. 21B, an attribute 2151 represents the management ID of the processing flow. However, the second cooperation processing flow definition file 2100 is transferred to the MFP 103 later during the processing flow transfer process in FIG. 7 and has a desired management ID given thereto by the MFP 103, and hence here, no management ID is given to the second cooperation processing flow definition file 2100.

An attribute 2152 represents the name of the processing flow. An attribute 2153 represents the serial ID of the processing flow. An attribute 2154 represents the serial ID of a cooperation processing flow as a cooperation source. The attributes 2153 and 2154 are set only for a cooperation processing flow executed by the MFP 101 in cooperation with another MFP. Unique values in the network are set as respective serial IDs thereof. In the present embodiment, it is assumed that each serial ID is formed by a twelve-digit number composed of "lower eight digits of an MAC (Media Access Control) address of an MFP"+"a four-digit sequential number managed by the MFP". However, the serial ID is only required to be a unique value in the network, and is not necessarily required to be configured as mentioned above. The serial ID may be configured in various forms including the number of digits.

In FIG. 21A, a tag 2101 indicates that a reception task is executed to receive a document. A tag 2102 specifies a received document. A tag 2103, in which the contents of the tag 1904 of the processing flow definition file 1900 are copied as they are, indicates that a task for combining documents is carried out to combine a plurality of documents into a single document. A tag 2104, in which the contents of the tag 1905 of the processing flow definition file 1900 are copied as they are, specifies documents to be combined. A tag 2105, in which the contents of the tag 1906 of the processing flow definition file 1900 are copied as they are, indicates that a printing task is executed to print the document.

As described hereinabove, the processing flow of "scanning in a document, combining a scanned-in document and a document stored in the HDD, and printing the combined document" is defined in the processing flow definition file 1900. However, the MFP 101 is capable of executing the processing flow only up to a portion concerning "specifying the scanned-in document and the document stored in the HDD". Therefore, the first cooperation processing flow definition file 2000 formed by tasks executable by the MFP 101 defines a processing flow of "transmitting the scanned-in document and the document stored in the HDD to the MFP 103", and the second cooperation processing flow definition file 2100 formed by tasks remaining to be executed defines the processing flow of "combining documents received from the MFP 101 and printing the combined document" in a manner continuous to the first cooperation processing flow definition file 2000.

Figure 22:
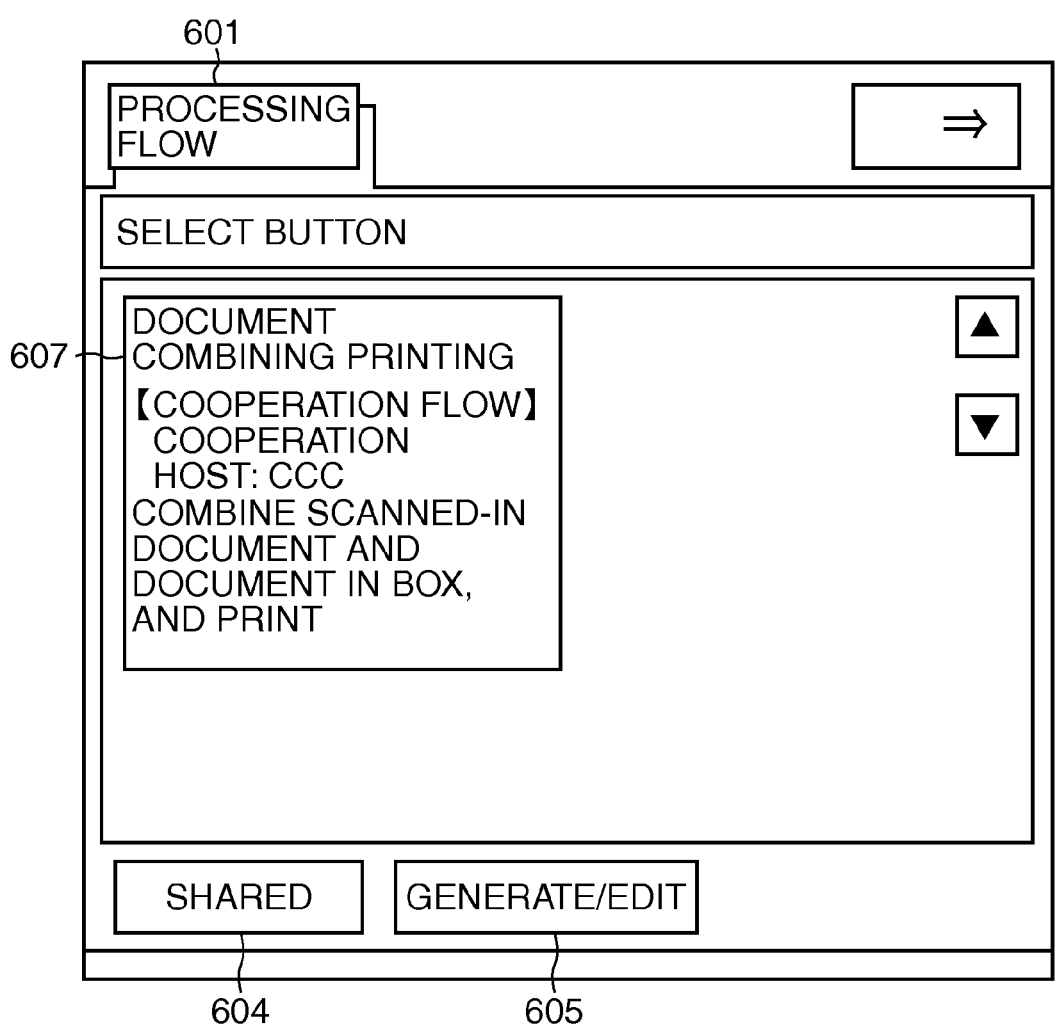
FIG. 22 is a diagram showing an example of an operation screen of the MFP 101 which is displayed when User B has logged in to the MFP 101.

FIG. 22 is a diagram showing an example of an operation screen of the MFP 101 for User B, which is displayed after the processing flow transfer process in FIG. 7 has been executed by the MFP 101 to transfer the processing flow of "transmitting the scanned-in document and the document stored in the HDD to the MFP 103" to the MFP 103.

In FIG. 22, a button 607 is for executing the first cooperation processing flow definition file 2000. On the button 607, there are displayed words of "[COOPERATION FLOW] COOPERATION HOST: CCC" which indicates that the button 607 is for executing a processing flow in cooperation with the MFP 103. The other buttons 601, 604 and 605 are not changed from those described above with reference to FIG. 6, and detailed descriptions thereof are omitted.

FIG. 23 is a diagram showing an example of a processing flow management file 2300 that is managed by the MFP 103 after execution of the processing flow reception process in FIG. 13 by the MFP 103.

Referring to FIG. 23, a column 2301 stores management IDs of processing flows. A column 2302 stores the names of the processing flows. A column 2303 stores information indicative of who has a right for accessing each processing flow. A column 2304 stores tasks that constitute each processing flow.

A column 2305 stores information indicative of whether or not the processing flow is a cooperation processing flow. If the processing flow is a cooperation processing flow, "Y" is stored in a box of the column 2305 associated with the processing flow, whereas when the processing flow can be executed by the MFP by itself, "N" is stored in the associated box of the column 1405.

When "Y" is stored in the column 2305, i.e. when the processing flow is a cooperation processing flow, a serial ID of the cooperation processing flow is stored in a box of a column 2306 associated with the processing flow. The serial ID is automatically given only to a cooperation processing flow by a MFP during generation of the cooperation processing flow, and a unique value in the network is given to the cooperation processing flow. Further, once a value is given to the cooperation processing flow during generation thereof, the value is not changed thereafter.

When "Y" is stored in the column 2305, i.e. when the processing flow is a cooperation processing flow, information indicative of the type of cooperation of the cooperation processing flow is stored in a box of a column 2307 associated with the processing flow. When the MFP 103 executes the cooperation processing flow earlier and an MFP other than the MFP 101 executes another predetermined cooperation processing flow later, "Src" is stored in the associated box of the column 2307. On the other hand, when the MFP other than the MFP 101 executes the cooperation processing flow earlier, and the MFP 103 executes the same later, "Dst" is stored in the associated box of the column 2307.

When "Y" is stored in the column 2305, i.e. when the processing flow is a cooperation processing flow, information on an MFP as an cooperation destination is stored in a box of a column 2308 associated with the processing flow. For example, the column 2308 stores the host name and the IP address of the MFP as the cooperation destination, and the serial ID of the cooperation processing flow to be executed by the cooperation destination. In the illustrated example, a processing flow registered with an ID of 1 is associated with the processing flow definition file 1900, and a processing flow registered with an ID of 2 is associated with the second cooperation processing flow definition file 2100. Since the processing flow definition file 1900 is associated with a processing flow executable by the MFP 103 by itself, "N" is set in the associated box of the column 2305.

On the other hand, the second cooperation processing flow definition file 2100 is associated with a cooperation processing flow which cooperates with the MFP 101 and is executed in a manner associated with the first cooperation processing flow definition file 2000 for the MFP 101. Therefore, "Y" is stored in the associated box of the column 2305. Further, since the second cooperation processing flow definition file 2100 is executed in the sequence of MFP 101→MFP 102, "Dst" is stored in the associated box of the column 2307. Further, the host name (AAA) and the IP address (192.168.0.101) of the MFP 101 as a cooperation partner are stored in the associated box of the column 2308.

Figure 24:
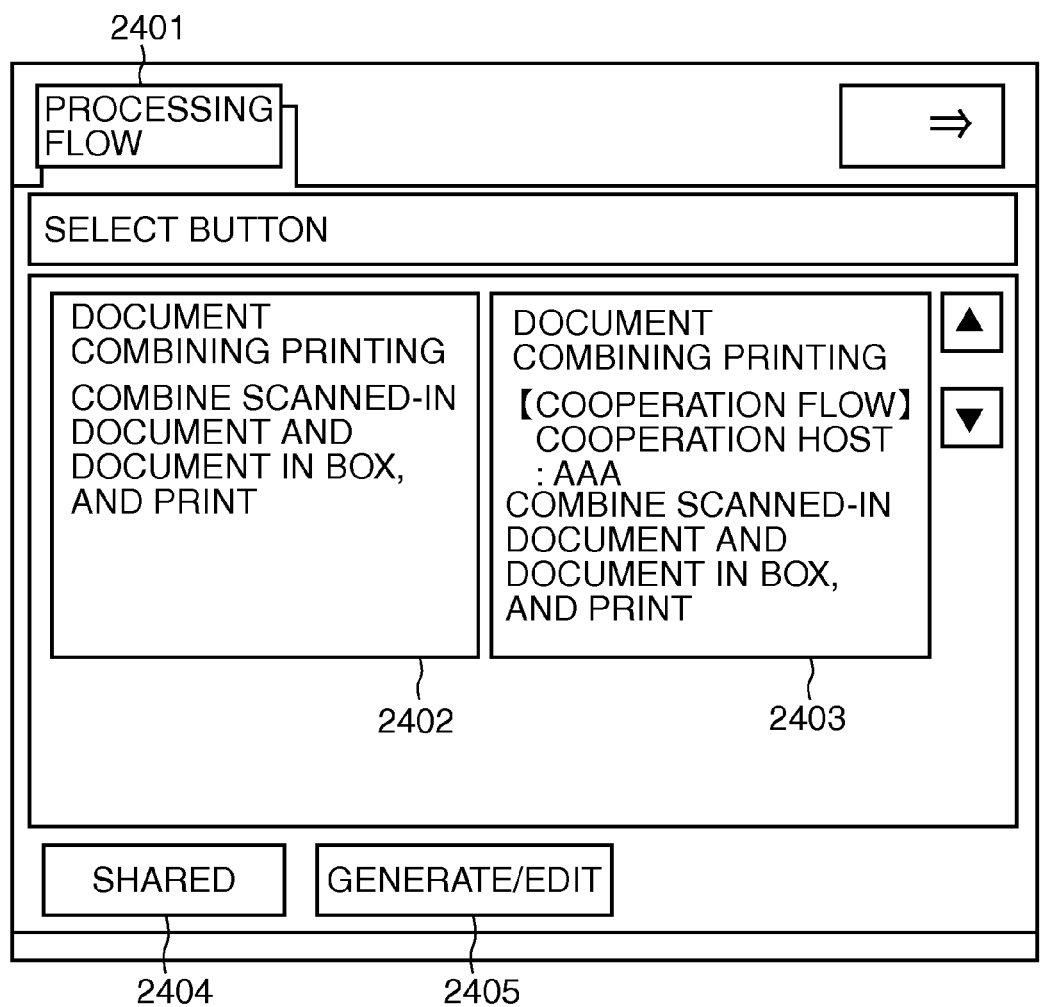
FIG. 24 is a diagram showing an example of an operation screen of the MFP 103 which is displayed when User B has logged in to the MFP 103.

FIG. 24 is a diagram showing an example of an operation screen which is displayed on the operating section 212 of the MFP 103 when User B has logged in to the MFP 103.

In FIG. 24, a button 2401 is for starting the processing flow application 300 to display a screen. In the present embodiment, it is assumed that no button for starting another application is displayed.

Buttons 2402 and 2403 are for calling and executing respective processing flows assigned thereto. A button 2404 is for performing transition to a shared screen that is displayed irrespective of the login user. A button (not shown) displayed when the button 2404 is depressed is for a processing flow which has "shared" set as a disclosure range in the column 2303 of the processing flow management file 2300. A button 2405 is for displaying a screen for generating and editing a processing flow.

Here, the button 2402 is for executing the processing flow definition file 1900, and the button 2403 is for executing the second cooperation processing flow definition file 2100. Whether or not each button is displayed is determined after the MFP 103 has performed the button display-determining process in FIG. 16. Since the processing flow definition file 1900 is not for a cooperation processing flow, the button 2402 associated therewith is displayed on the operation screen. Further, the second cooperation processing flow definition file 2100 is for a cooperation processing flow of which the type of cooperation is "Dst" and further the final task of which is "Print", and hence the button 2403 associated therewith is displayed on the operation screen.

If User B logs in to the MFP 103 to depress the button 2402, the MFP 103 executes the processing flow-executing process in FIG. 17 to execute the processing flow defined by the processing flow definition file 1900 associated with the button 2402.

If User B logs in to the MFP 101 to depress the button 607, the MFP 101 executes the processing flow-executing process in FIG. 17 to execute a cooperation processing flow defined by the first cooperation processing flow definition file 2000 associated with the button 607. Then, a scanned-in document and a document stored in the HDD are transmitted from the MFP 101 to the MFP 103, and together therewith, an instruction for executing a processing flow defined by the second cooperation processing flow definition file 2100 is transmitted. Consequently, the cooperation processing flow-executing process in FIG. 18 is executed by the MFP 103.

When the MFP 103 receives the instruction for executing the cooperation processing flow defined by the second cooperation processing flow definition file 2100 (step S1801), the MFP 103 determines whether or not the instructed cooperation processing flow is a flow a button for which is to be displayed (steps S1802 and S1803). In the present case, it is determined that a button for the cooperation processing flow is to be displayed, the MFP 103 does not execute the cooperation processing flow at the time, but waits for User B to log in (step S1804). Upon occurrence of the login of User B, the MFP 103 displays the operation screen shown in FIG. 24 (step S1805), and waits for the button 2403 associated with the second cooperation processing flow definition file 2100 to be depressed (step S1806). When the button 2403 is depressed, in response to the depression of the button 2403, the MFP 103 executes the cooperation processing flow defined by the second cooperation processing flow definition file 2100 associated with the button 2403.

As described heretofore, according to the present embodiment, when there is a processing flow that cannot be executed by an MFP by itself, the MFP searches for another MFP that can execute the processing flow, and transfers the processing flow to an MFP determined as a transfer destination. Thus, a button for executing the processing flow is displayed on the MFP as the transfer destination, thereby making it possible to execute the processing flow as desired by a user without changing the contents of the processing flow.

Further, if the processing flow is divided to newly generate a cooperation processing flow, and a button for executing the cooperation processing flow is displayed, it is also possible to execute the processing flow not only by the MFP as the transfer destination but also by the MFP as the transfer source.

Furthermore, when the final task of the processing flow is printing, a button for executing the cooperation processing flow is also displayed on the MFP as the transfer destination so as to prevent the cooperation processing flow from being executed until the execution button is depressed. This makes it possible to prevent an undesired event that user's depression of the button for executing the cooperation processing flow on the MFP as the transfer source causes the printing process to be immediately executed by another MFP physically away from the MFP as the transfer source, thereby causing a confidential document of the user or the like to be left in a discharging tray. On the other hand, when the final task of the processing flow is not printing (transmission of a document to another MFP, storage of a document in the HDD, or the like), no button for executing the cooperation processing flow is displayed on the MFP as the transfer destination. In this case, at a time point when the user depresses the button for executing the cooperation processing flow on the MFP as the transfer source, the MFP as the cooperation destination immediately executes a cooperation processing flow associated with the button. This makes it unnecessary for the user to move to the MFP as the transfer destination to perform operations e.g. for logging in to the MFP, depressing a button, and so forth, whereby it is possible to perform a desired processing flow only by a simple operation.

Next, a description will be given of an image forming apparatus according to a second embodiment of the present invention.

In the above-described first embodiment, as shown in FIG. 24, the button 2403 for executing a processing flow defined by the second cooperation processing flow definition file 2100 is displayed whenever User B has logged in. Actually, however, the button 2403 is activated only when User B depresses the FIG. 22 button 607 in advance on the MFP 101. Further, since the contents to be displayed by the button 2402 are similar to the contents to be displayed by the button 2403, it is difficult for User B to determine which button should be depressed.

Therefore, except when User B depresses the button 607 in FIG. 22 in advance on the MFP 101, the whole of the button 2403 may be grayed out to inhibit the button 2403 from being depressed by User B.

Figure 25:
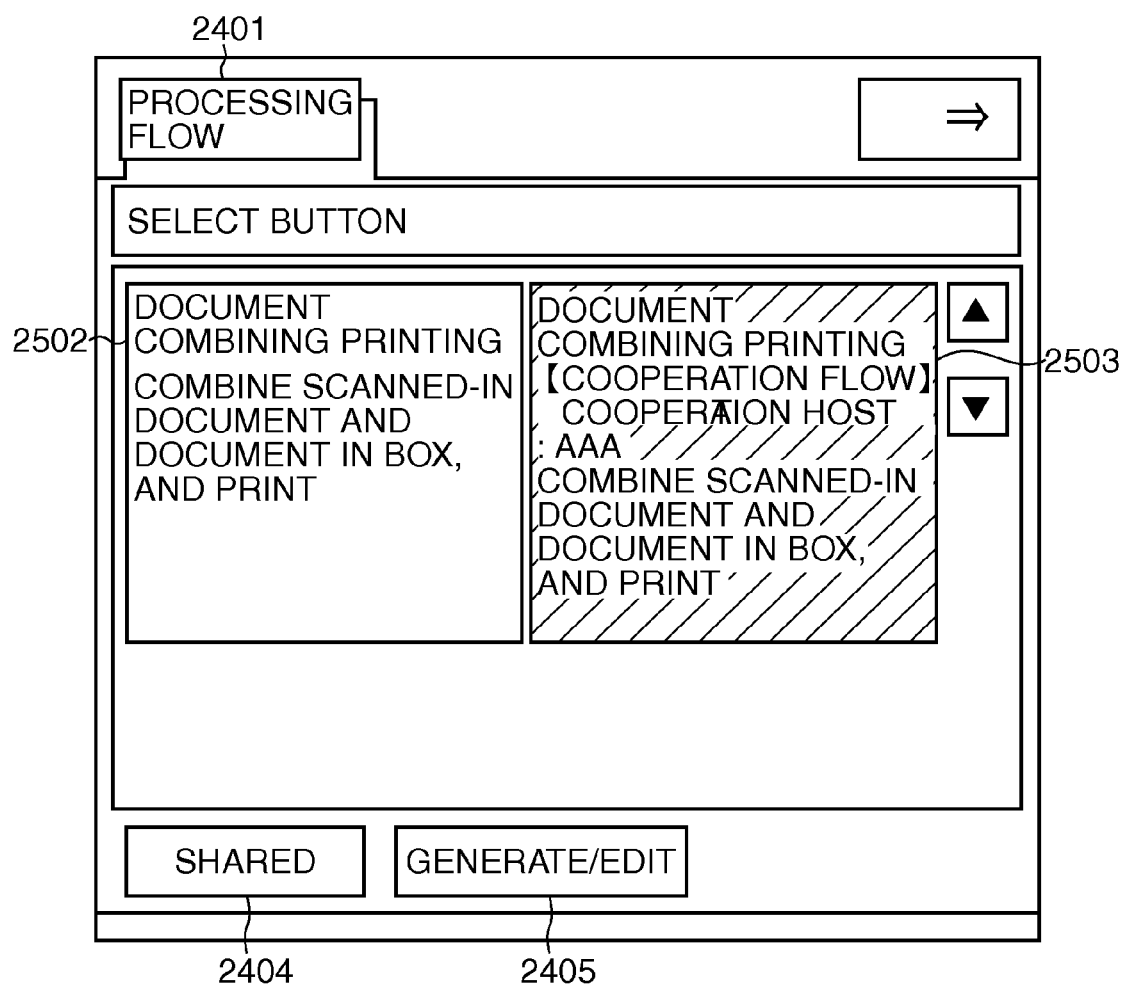
FIG. 25 is a diagram showing an example of an operation screen which the MFP 103 according to a second embodiment of the present invention displays when User B has logged in before instructing execution of a cooperation processing flow.

FIG. 25 is a diagram showing an example of an operation screen which is displayed on the operating section 212 by the MFP 103 according to the second embodiment of the present invention when User B has logged in to the MFP 103. Here, let it be assumed that User B has not depressed the button 607 in FIG. 22 in advance on the MFP 101, that is, no instruction for executing the second cooperation processing flow definition file 2100 is issued from the MFP 101 to the MFP 103. Therefore, a button 2503 for executing the second cooperation processing flow definition file 2100 is grayed out to inhibit depression thereof. On the other hand, the button 2502 for executing a processing flow defined by the processing flow definition file 1900 is displayed to permit depression thereof.

Figure 26:
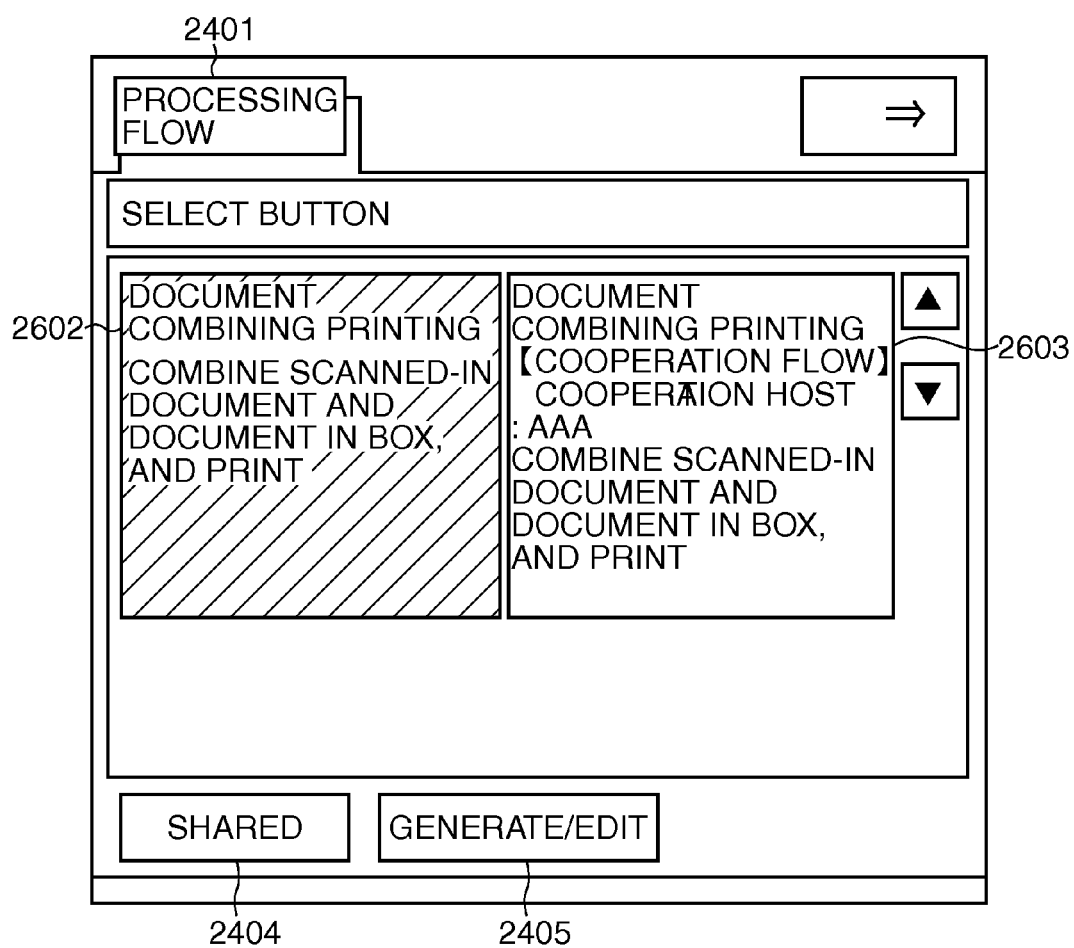
FIG. 26 is a diagram showing an example of an operation screen which the MFP 103 according to the second embodiment of the present invention displays when User B has logged after instructing execution of a cooperation processing flow.

FIG. 26 is a diagram showing an example of an operation screen which the MFP 103 according to the second embodiment of the present invention displays when User B has logged in. Here, however, differently from FIG. 25, it is assumed that User B has depressed the button 607 shown in FIG. 22 in advance on the MFP 101, that is, the MFP 103 has been instructed to execute the second cooperation processing flow definition file 2100 by the MFP 101.

Oppositely to FIG. 25, in FIG. 26, a button 2603 for executing the processing flow defined by the second cooperation processing flow definition file 2100 is in a state ready for depression. On the other hand, a button 2602 for executing the processing flow defined by the processing flow definition file 1900 is grayed out to inhibit depression thereof.

This enables the user to depress the button 2603 without erroneously depressing the button 2602 to thereby start a desired cooperation processing flow in a state waiting for the button 2603 to be depressed.

As described hereinabove, according to the second embodiment of the present invention, the MFP grays out a button as required to inhibit depression of the button by the user. This makes it possible to prevent the user from erroneously depressing a button associated with an unexecutable processing flow or a button different from a button intended by the user, or from being confused in determining which button should be depressed.

The purpose of the above-described processing is performed only with the goal of preventing the user from erroneously depressing a button associated with unexecutable processing flow or a button different from a button intended by the user, or from being confused in determining which button should be depressed, and hence a method for achieving the goal is not necessarily limited to the above-described display method including graying out of buttons. Every method for realizing the above-described goal is included in the scope of the present invention. For example, in FIG. 25, the button 2503 may be configured as a non-display button from the beginning without being grayed out. Similarly, in FIG. 26, the button 2602 may be configured as a non-display button from the beginning without being grayed out. Further, the button 2603 may be displayed in a manner different from the other buttons only when User B depresses the FIG. 22 button 607 in advance on the MFP 101. For example, only the button 2603 may be changed in the color of display, blinked, or increased in size. Alternatively, a message for prompting the user to depress the button 2603 may be simply displayed in a vacant area of the operation screen. Every method other than the above for making the button 2603 more conspicuous than the other buttons is included in the scope of the present invention.

Next, an image forming apparatus according to a third embodiment of the present invention will be described.

Although in the above-described first embodiment, as shown in the flowchart of FIG. 17, the MFP terminates the process immediately after transmitting the instruction for executing the second cooperation processing flow (step S1707), the MFP may await notification of the results of execution of the second cooperation processing flow from another MFP as a cooperation destination.

Figure 27:
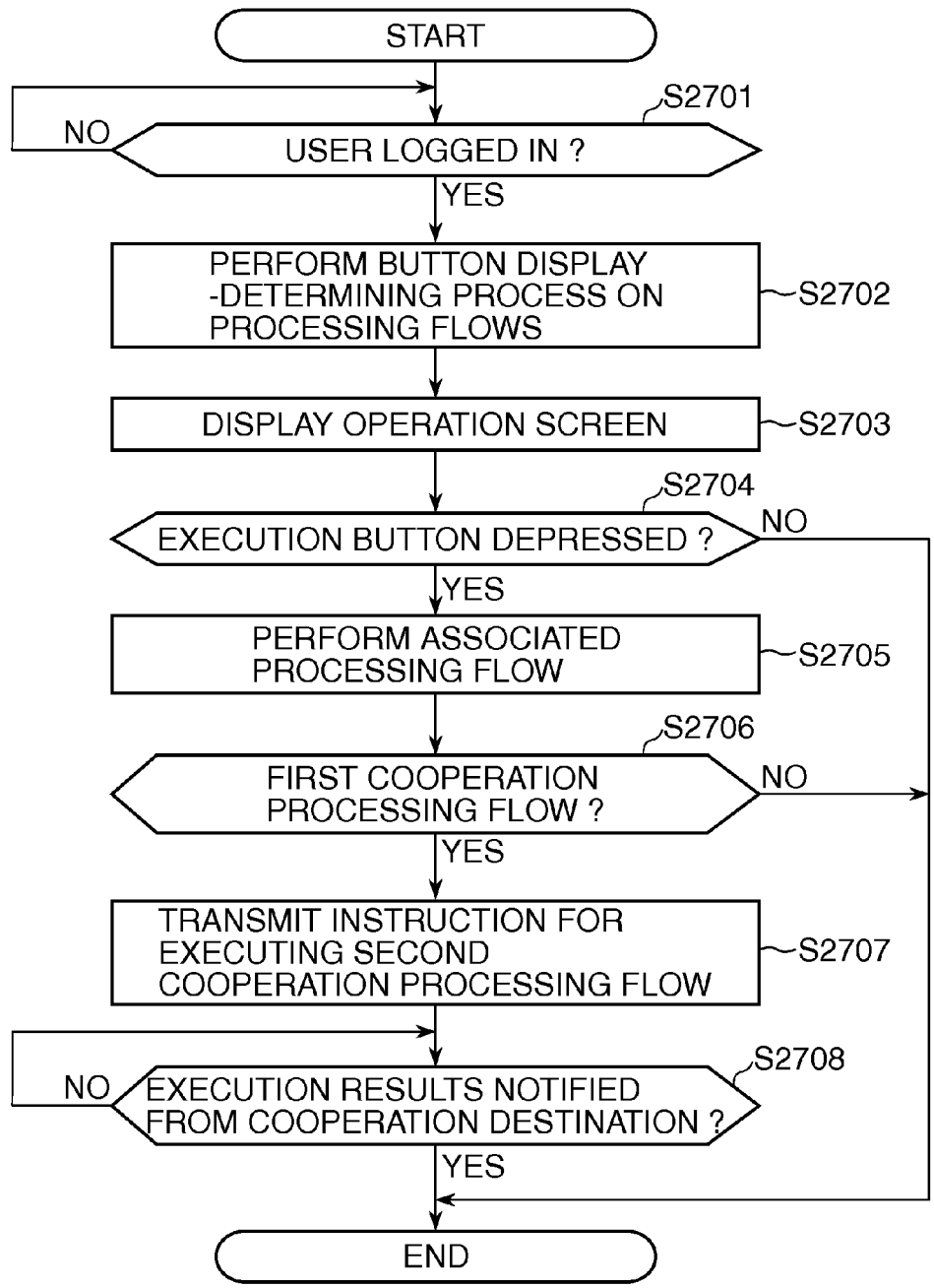
FIG. 27 is a flowchart of a processing flow-executing process executed by an MFP according to a third embodiment of the present invention.

FIG. 27 is a flowchart of a processing flow-executing process executed by the MFP according to the third embodiment of the present invention.

In FIG. 27, steps S2701 to S2708 indicate processing steps of the processing flow-executing process executed by an MFP (MFP 101 in the present example) which executes a processing flow upon reception of an instruction for executing the processing flow from the user. A control program implementing the processing flow-executing process is stored in the ROM 203 of the MFP, and is executed by the CPU 201. Further, the steps S2701 to S2707 are identical to the respective steps S1701 to S1707 in FIG. 17, and detailed descriptions thereof are omitted.

In the step S2707, the MFP transmits an instruction for executing the second cooperation processing flow, and then waits for an MFP as a cooperation destination (MFP 102 or 103 in the present example) to notify the MFP of the results of execution of the second cooperation processing flow (step S2708). This step is an example of processing executed by a waiting unit in the present invention. Upon reception of the results of the execution of the second cooperation processing flow, the MFP terminated the present process.

Figure 28:
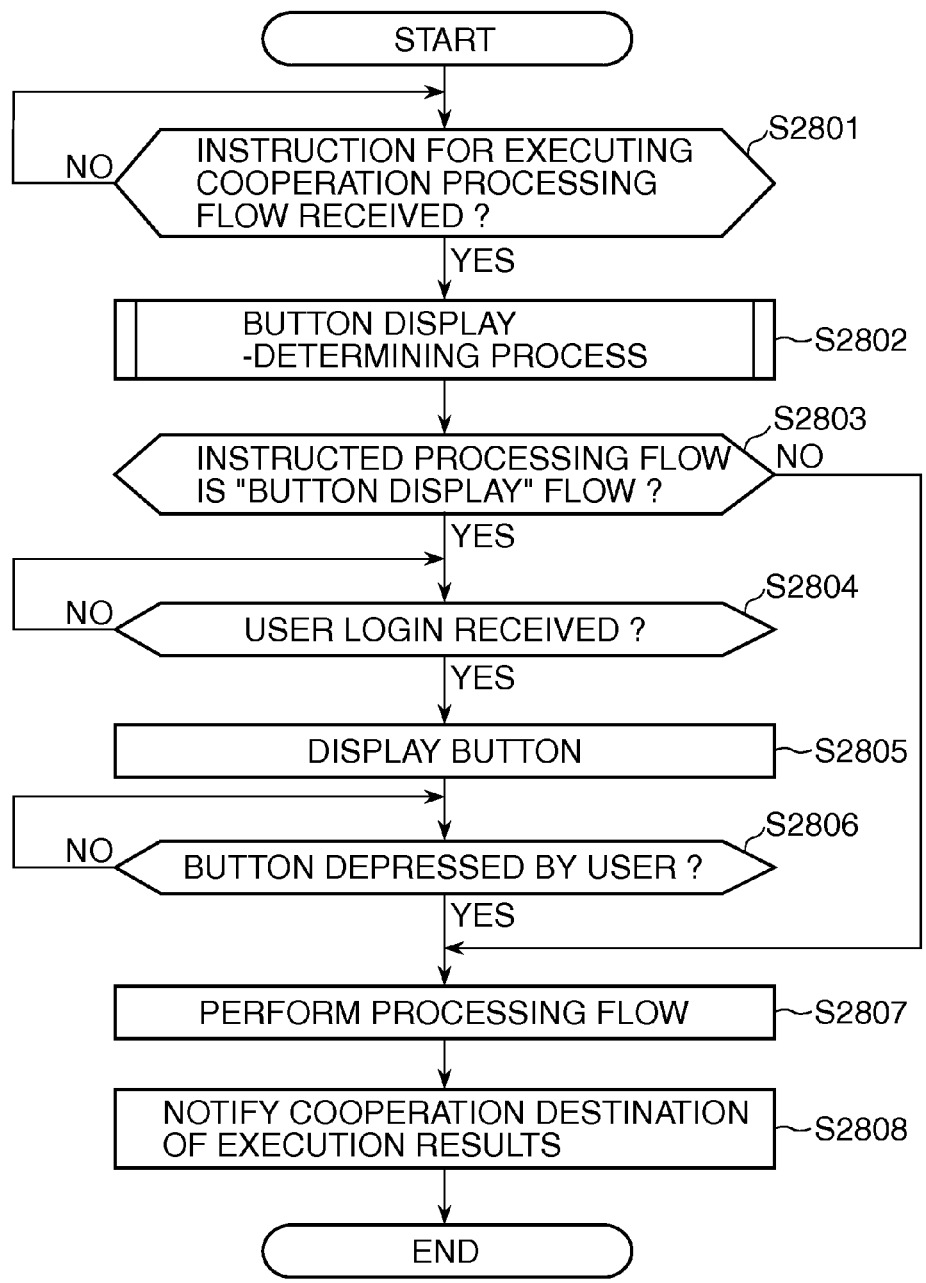
FIG. 28 is a flowchart of a cooperation processing flow-executing process executed by the MFP according to the third embodiment of the present invention.

FIG. 28 is a flowchart of a process carried out in the third embodiment of the present invention by the MFP as the cooperation destination when the MFP receives the instruction for executing the predetermined cooperation processing flow from the MFP as the cooperation source.

In FIG. 28, steps S2801 to S2808 indicate processing steps of the process executed by the MFP as the cooperation destination when the processing flow-executing process in FIG. 27 is executed by the MFP as the cooperation source and the instruction for executing the cooperation processing flow is transmitted from the cooperation source. A control program implementing the process is stored in the ROM 203 within the MFP as the cooperation destination, and is executed by the CPU 201. Further, the steps S2801 to S2807 are identical to the respective steps S1801 to S1807 shown in FIG. 18, and detailed descriptions thereof are omitted.

In the step S2807, the MFP as the cooperation destination carries out the instructed cooperation processing flow, and then notifies the MFP as the cooperation source of the results of execution of the cooperation processing flow (step S2808). This step is an example of processing executed by a notification unit in the present invention.

As described hereinabove, according to the third embodiment, when an MFP as a cooperation source transmits an instruction for executing a cooperation processing flow, the MFP awaits notification of the results of execution of the cooperation processing flow from an MFP as a cooperation destination. This makes it possible to store a more detailed execution history of the processing flow, including e.g. the results of execution of the cooperation processing flow executed by the cooperation destination. The user can recognize the detailed execution history simply with reference to the execution history stored in one of the MFP as the cooperation source and the MFP as the cooperation destination, which increases user friendliness.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-283307 filed Nov. 4, 2008, which is hereby incorporated by reference herein in its entirety.

What is claimed is:

1. An image processing apparatus comprising:
a registration unit that registers a processing flow set by combining a plurality of processes including an image inputting process and an image outputting process;
an execution unit that executes the plurality of processes based on the registered processing flow;
a first transmission unit configured to transmit, if the registered processing flow includes at least one process that cannot be executed by the image processing apparatus, to each of other image processing apparatuses, a request for confirming whether or not the processing flow can be executed thereby;
a first reception unit configured to receive a response to the request transmitted by said first transmission unit, the response indicating that the processing flow can be executed, from any of the other image processing apparatuses;
a decision unit configured to decide a transfer destination of the processing flow, out of the any of the other image processing apparatuses that have transmitted the response;
a generation unit configured to generate from the processing flow a first cooperation processing flow including processes that can be executed by the image processing apparatus, and a second cooperation processing flow including at least one process that cannot be executed by the image processing apparatus;
a transfer unit configured to transfer the second cooperation processing flow to the transfer destination decided by said decision unit;
a first display unit configured to display an execution button for executing the first cooperation processing flow;
a second transmission unit configured to transmit an instruction for executing the second cooperation processing flow, if a user depresses the execution button for executing the first cooperation processing flow, to the transfer destination, after the execution unit executes the first cooperation processing flow;
a second reception unit configured to receive a request for confirming whether or not the processing flow can be executed;
a first determination unit configured to determine whether or not the processing flow can be executed by the image processing apparatus;
a third transmission unit configured to transmit the response indicating that the processing flow can be executed, if said first determination unit determines that the processing flow can be executed, to a transmission source of the request received by said second reception unit;
a third reception unit configured to receive the second cooperation processing flow from the transmission source of the request;
a fourth reception unit configured to receive the instruction for executing the second cooperation processing flow;
a second determination unit configured to determine whether or not an execution button for executing the second cooperation processing flow is to be displayed;
a second display unit configured to display the execution button for executing the second cooperation processing flow, if said second determination unit determines that the execution button is to be displayed; and
a processing unit configured to execute the second cooperation processing flow when said second determination unit determines that the execution button is not to be displayed;
wherein said second determination unit determines whether or not the execution button is to be displayed, depending on whether or not a final process of the second cooperation processing flow is a printing process; and
wherein said second display unit displays the execution button for executing the second cooperation processing flow in a form different from a form of an execution button for executing another processing flow.

2. The image processing apparatus according to claim 1, further comprising a waiting unit configured to wait for a notification of results of execution of the second cooperation processing flow after said second transmission unit transmits the instruction for executing the second cooperation processing flow.

3. A method of controlling an image processing apparatus including a registration unit that registers a processing flow set by combining a plurality of processes including an image inputting process and an image outputting process, and an execution unit that executes the plurality of processes based on the registered processing flow, comprising:
a first transmitting step of transmitting, if the registered processing flow includes at least one process that cannot be executed by the image processing apparatus, to each of other image processing apparatuses, a request for confirming whether or not the processing flow can be executed thereby;
a first receiving step of receiving a response to the transmitted request, the response indicating that the processing flow can be executed, from any of the other image processing apparatuses;
a deciding step of deciding a transfer destination of the processing flow, out of the any of the other image processing apparatuses that have transmitted the response;
a generating step of generating from the processing flow a first cooperation processing flow including processes that can be executed by the image processing apparatus, and a second cooperation processing flow including at least one process that cannot be executed by the image processing apparatus;
a transferring step of transferring the second cooperation processing flow to the decided transfer destination;
a displaying step of displaying an execution button for executing the first cooperation processing flow;
a second transmitting step of transmitting, when a user depresses the execution button for executing the first cooperation processing flow, an instruction for executing the second cooperation processing flow to the transfer destination, after the execution unit executes the first cooperation processing flow;
a second receiving step of receiving a request for confirming whether or not the processing flow can be executed;
a determining step of determining whether or not the processing flow can be executed by the image processing apparatus;

a third transmitting step of transmitting, when it is determined that the processing flow can be executed, the response indicating that the processing flow can be executed, to a transmission source of the received request;

a third receiving step of receiving the second cooperation processing flow from the transmission source of the request;

a fourth receiving step of receiving the instruction for executing the second cooperation processing flow;

a second determining step of determining whether or not an execution button for executing the second cooperation processing flow is to be displayed;

a second displaying step of displaying, when it is determined that the execution button is to be displayed, the execution button for executing the second cooperation processing flow; and an executing step of executing the second cooperation processing flow when it is determined that the execution button is not to be displayed;

wherein said second determining step determines whether or not the execution button is to be displayed, depending on whether or not a final process of the second cooperation processing flow is a printing process; and wherein said second displaying step displays the execution button for executing the second cooperation processing flow in a form different from a form of an execution button for executing another processing flow.

4. A non-transitory computer-readable storage medium storing a program for causing a computer to execute a method of controlling an image processing apparatus including a registration unit that registers a processing flow set by combining a plurality of processes including an image inputting process and an image outputting processes, and an execution unit that executes the plurality of processes based on the registered processing flow, wherein the method comprises:

a first transmitting step of transmitting, if the registered processing flow includes at least one process that cannot be executed by the image processing apparatus, to each of other image processing apparatuses, a request for confirming whether or not the processing flow can be executed thereby;

a first receiving step of receiving a response to the transmitted request, the response indicating that the processing flow can be executed, from any of the other image processing apparatuses;

a deciding step of deciding a transfer destination of the processing flow, out of the any of the other image processing apparatuses that have transmitted the response;

a generating step of generating from the processing flow a first cooperation processing flow including processes that can be executed by the image processing apparatus, and a second cooperation processing flow including at least one process that cannot be executed by the image processing apparatus;

a transferring step of transferring the second cooperation processing flow to the decided transfer destination;

a displaying step of displaying an execution button for executing the first cooperation processing flow;

a second transmitting step of transmitting, when a user depresses the execution button for executing the first cooperation processing flow, an instruction for executing the second cooperation processing flow to the transfer destination, after the execution unit executes the first cooperation processing flow;

a second receiving step of receiving a request for confirming whether or not the processing flow can be executed;

a determining step of determining whether or not the processing flow can be executed by the image processing apparatus;

a third transmitting step of transmitting, when it is determined that the processing flow can be executed, the response indicating that the processing flow can be executed, to a transmission source of the received request;

a third receiving step of receiving the second cooperation processing flow from the transmission source of the request;

a fourth receiving step of receiving the instruction for executing the second cooperation processing flow;

a second determining step of determining whether or not an execution button for executing the second cooperation processing flow is to be displayed;

a second displaying step of displaying, when it is determined that the execution button is to be displayed, the execution button for executing the second cooperation processing flow; and an executing step of executing the second cooperation processing flow when it is determined that the execution button is not to be displayed;

wherein said second determining step determines whether or not the execution button is to be displayed, depending on whether or not a final process of the second cooperation processing flow is a printing process; and wherein said second displaying step displays the execution button for executing the second cooperation processing flow in a form different from a form of an execution button for executing another processing flow.

* * * * *